(12) United States Patent
Downton

(10) Patent No.: US 10,386,515 B2
(45) Date of Patent: Aug. 20, 2019

(54) METHOD AND APPARATUS FOR ANALYZING FRACTURES USING AVOAZ INVERSION

(71) Applicant: CGG SERVICES SAS, Massy (FR)

(72) Inventor: Jonathan Downton, Calgary (CA)

(73) Assignee: CGG SERVICES SAS, Massy (FR)

( * ) Notice: Subject to any disclaimer, the term of this patent is extended or adjusted under 35 U.S.C. 154(b) by 228 days.

(21) Appl. No.: 15/366,240

(22) Filed: Dec. 1, 2016

(65) Prior Publication Data

US 2017/0160413 A1    Jun. 8, 2017

Related U.S. Application Data

(60) Provisional application No. 62/410,443, filed on Oct. 20, 2016, provisional application No. 62/262,975, filed on Dec. 4, 2015.

(51) Int. Cl.
*G01V 1/30* (2006.01)

(52) U.S. Cl.
CPC ............. *G01V 1/307* (2013.01); *G01V 1/306* (2013.01); *G01V 2210/586* (2013.01); *G01V 2210/632* (2013.01); *G01V 2210/646* (2013.01); *G01V 2210/677* (2013.01)

(58) Field of Classification Search
CPC .. G01V 1/307; G01V 1/306; G01V 2210/677; G01V 2210/646; G01V 2210/632; G01V 2210/586
See application file for complete search history.

(56) References Cited

U.S. PATENT DOCUMENTS

| | | | |
|---|---|---|---|
| 5,848,379 A * | 12/1998 | Bishop | G06F 17/17 702/6 |
| 7,311,738 B2 * | 12/2007 | Kitayama | H01L 21/682 257/E21.521 |
| 8,593,904 B2 | 11/2013 | Soubaras | |
| 8,792,303 B2 | 7/2014 | Downton et al. | |
| 9,105,075 B1 * | 8/2015 | Yu | G01V 1/364 |

(Continued)

FOREIGN PATENT DOCUMENTS

| WO | 2015/101832 A2 | 7/2015 |
|---|---|---|
| WO | 2015/145257 A2 | 10/2015 |

OTHER PUBLICATIONS

Mahmoudian et al., AVAZ inversion for anisotropy parameters of a fractured medium: A physical modeling study (Year: 2011).*

(Continued)

*Primary Examiner* — Mohammad K Islam
(74) *Attorney, Agent, or Firm* — Patent Portfolio Builders PLLC

(57) ABSTRACT

Fracture orientation ambiguity in the results of amplitude variation with offset and azimuth inversion is overcome by using additional geological information. Methods, apparatus and executable codes stored on non-transitory media cause, for each interface encountered by traces in a CMP gather, calculating angle-dependent azimuthal Fourier coefficients, performing a nonlinear inversion of amplitude versus offset and azimuth, AVOAz, equations built using the angle-dependent azimuthal Fourier coefficients to determine possible fracture orientations, and selecting one of the possible fracture orientations using constraints based on the additional geological information.

20 Claims, 19 Drawing Sheets

(56) References Cited

U.S. PATENT DOCUMENTS

| | | | | |
|---|---|---|---|---|
| 2004/0117121 | A1* | 6/2004 | Gray | G01V 1/30 702/11 |
| 2006/0155477 | A1* | 7/2006 | Matson | G01V 1/36 702/14 |
| 2009/0048784 | A1* | 2/2009 | Matson | G01V 1/364 702/14 |
| 2010/0004866 | A1* | 1/2010 | Rabinovich | G01V 3/28 702/7 |
| 2010/0027376 | A1* | 2/2010 | Washbourne | G01V 1/28 367/25 |
| 2011/0222370 | A1* | 9/2011 | Downton | G01V 1/282 367/73 |
| 2011/0295510 | A1* | 12/2011 | Gulati | G01V 1/28 702/16 |
| 2012/0271550 | A1* | 10/2012 | Jiang | G01V 1/282 702/16 |
| 2014/0269185 | A1* | 9/2014 | Ferber | G01V 1/308 367/38 |
| 2014/0286128 | A1* | 9/2014 | Grimm | G01V 1/28 367/24 |
| 2015/0073715 | A1* | 3/2015 | Aarre | G01V 1/003 702/14 |
| 2016/0116620 | A1* | 4/2016 | Sassen | G01V 1/368 702/17 |

OTHER PUBLICATIONS

Downton et al., Azimuthal Fourier Coefficients. (Year: 2011).*
Ecker et al. Seismic AVO analysis of methane hydrate structures (Year: 2001).*
Extended European Search Report in corresponding European Application No. EP 16 30 6614 dated May 19, 2017.
J. Downton, et al.; "Interpreting azimuthal Fourier coefficients for anisotropic and fracture parameters"; Interpretation; vol. 3, No. 3, XP05536766; Aug. 2, 2015; pp. ST-9 to ST-27.
A. Rüger, et al.; "Wide-azimuth amplitude-variation-with-offset analysis of anisotropic fractured reservoirs"; Encyclopeida of Exploration Geophysics, XP055339300; Jan. 2, 2014; pp. N1-1 to N1-13.
A. Bakulin et al. "Estimation of Fracture Parameters from Reflection Seismic Data—Part I: HTI Model Due to a Single Fracture Set", GEOPHYSICS, Nov.-Dec. 2000, vol. 65, No. 6, pp. 1788-1802.
J. Downton et al., "AVAZ Parameter Uncertainty Estimation", 76th Annual International Meeting, SEG Technical Program Expanded Abstracts, 2006, pp. 234-238, doi: 10.1190/1.2370006.
J. Downton et al., "Azimuthal Simultaneous Elastic Inversion for Fracture Detection", SEG Technical Program Expanded Abstracts, 2010, pp. 263-267.
J. Downton et al., "Azimuthal Fourier Coefficients", CSEG Recorder, Dec. 2011, vol. 36, No. 10, pp. 22-36.
J. Downton et al., "Interpreting Azimuthal Fourier Coefficients for Anisotropic and Fracture Parameters", Interpretation, Aug. 2015, vol. 3, No. 3, pp. ST9-ST27.
D. Gray et al., "Fracture Detection Using 3D Seismic Azimuthal AVO", CSEG Recorder, Mar. 2008, vol. 29, No. 10, pp. 40-49.
J.A. Hudson, "Wave Speeds and Attenuation of Elastic Waves in Material Containing Cracks", Geophys. J. Royal Astronomy Soc., 1981, 64, pp. 133-150.
O. Heidbach et al., "The World Stress Map Database Release 2008", Tectonophysics, 462, doi:10.1016/j.tecto.2009.1007.1023 (http://dc-app3-14.gfz-potsdam.de/pub/download_data/download_data.html).
L.R. Lines et al., "Tutorial: A Review of Least-Squares Inversion and its Application to Geophysical Problems", Geophysical Prospecting, 1984, vol. 32, Issue 2, pp. 159-186.
C.P. Ross, "Effective AVO Crossplot Modeling: A Tutorial", GEOPHYSICS, May-Jun. 2000, vol. 65, No. 3, pp. 700-711.
A. Rüger, "Variation of P-wave Reflectivity with Offset and Azimuth in Anisotropic Media", GEOPHYSICS, May-Jun. 1998, vol. 63, No. 3, pp. 935-947.
M. Schoenberg, "Elastic Behaviour Across Linear Slip Interfaces", Journal of the Acoustical Society of America, Nov. 1980, vol. 68, No. 5, pp. 1516-1521.
M. Schoenberg et al., "Elastic Wave Propagation in Media with Parallel Fractures and Aligned Cracks", Geophysical Prospecting, 1988, vol. 36, pp. 571-590.
M. Schoenberg et al., "Seismic Anisotropy of Fractured Rock", GEOPHYSICS, Jan.-Feb. 1995, vol. 60, No. 1, pp. 204-211.
I.N. Sneddon, "The Distribution of Stress in the Neighbourhood of a Crack in an Elastic Solid", Proceedings of the Royal Society of London, Series A, Mathematical and Physical Sciences, Oct. 23, 1945.
L. Thomsen, "Weak Elastic Anisotropy", GEOPHYSICS, Oct. 1986, vol. 51, No. 10, pp. 1954-1966.
Z. Wang, "Seismic Anisotropy in Sedimentary Rocks, Part 2: Laboratory Data", GEOPHYSICS, Sep.-Oct. 2002, vol. 67, No. 5, pp. 1423-1440.

* cited by examiner

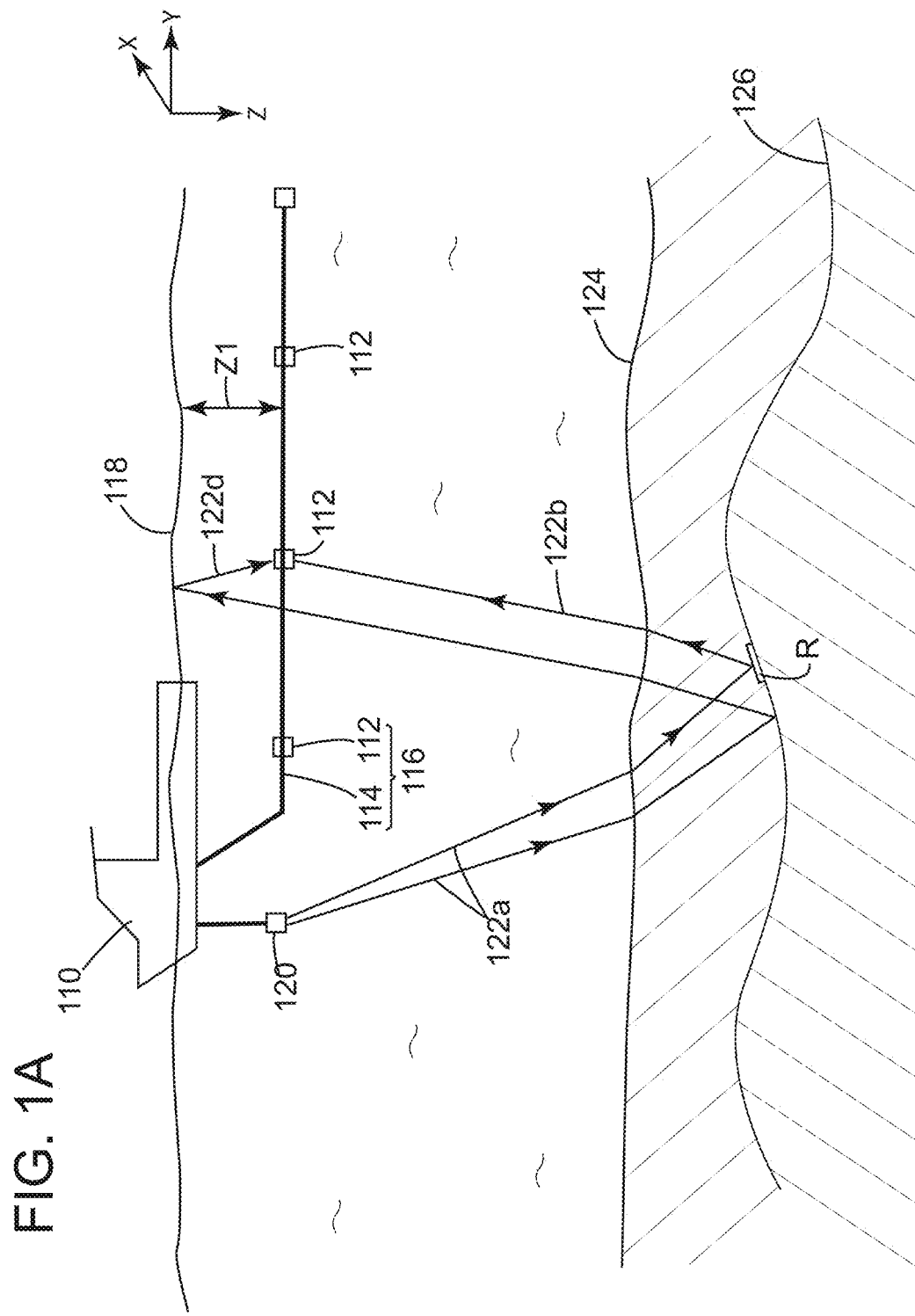

METHOD AND APPARATUS FOR ANALYZING FRACTURES USING AVOAZ INVERSION

CROSS-REFERENCE TO RELATED APPLICATIONS

The present application is related to and claims the benefit of priority of U.S. Provisional Application 62/262,975 filed Dec. 4, 2015, and U.S. Provisional Application 62/410,443 filed Oct. 20, 2016, the entire contents of which are incorporated herein by reference.

BACKGROUND

Technical Field

Embodiments of the subject matter disclosed herein generally relate to methods and systems for characterizing fractures based on seismic data; more particularly, to mechanisms and techniques for solving azimuth angle ambiguity thus improving amplitude variation with offset and azimuth (AVOAz) technique by incorporating geological information and/or using far-offset (i.e., larger incidence angles) data.

Discussion of the Background

Hydrocarbons (i.e., crude oil and natural gas) may be found in layers of rock deep beneath the surface of the earth or seafloor. Prospecting in search of hydrocarbon resources is an ongoing process driven by continuously increasing worldwide demand. Seismic surveys are a prospecting tool used to generate a profile (image) of underground geophysical structures. This profile provides information indicating whether hydrocarbons are likely present. Obtaining high-resolution images of underground geophysical structures based on seismic data is, therefore, desirable.

During a marine seismic survey, as illustrated in a vertical plane (yz) view in FIG. 1A, a vessel 110 tows plural detectors 112, which are disposed along a cable 114. Those skilled in the art use the term "streamer" for cable 114 and its corresponding detectors 112. Vessel 110 may tow plural streamers 116 in the horizontal (xy) plane. Streamer 116 is towed at a substantially constant depth $z_1$ relative to the water surface 118. However, streamers may be towed slanted (i.e., to form a constant angle) with respect to the water surface, or may have a curved profile as described, for example, in U.S. Pat. No. 8,593,904, the entire content of which is incorporated herein by reference.

Vessel 110 (or another vessel) may also tow a seismic source 120 configured to generate acoustic waves 122a. Acoustic waves 122a propagate downward and penetrate the seafloor 124. When encountering a reflecting structure 126 (reflector R), an acoustic wave is at least partially reflected. Reflected acoustic waves 122b and 122c propagate upward. For simplicity, FIG. 1A shows only two paths 122a corresponding to the source-emitted acoustic waves. Reflected acoustic wave 122b is recorded by various detectors 112 (recorded signals are called traces), while reflected wave 122c passes detectors 112 and is reflected back at the water surface 118 (the interface between the water and air serving as a quasi-perfect reflector to mirror acoustic waves). The wave reflected by the water surface may then be detected as illustrated by wave 122d in FIG. 1A. Wave 122d is normally referred to as a ghost wave because it is due to a water-surface reflection traveling downward, rather than upward directly from inside the explored structure.

FIG. 1B illustrates the geometry of a wave 122A at R in FIG. 1A (considered horizontal for the relevant reflection area). The geometry is characterized by the incidence/reflection acute angle $\theta$ and the azimuth angle $\phi$ in FIG. 1b. The incidence/reflection acute angle $\theta$ is formed by the incoming or reflected wave and vertical direction, which is considered normal to the reflector's surface. The azimuth angle $\phi$ is the angle between the reflected wave's projection in the horizontal plane and a reference direction (x-North).

The detectors record amplitude versus time series, known as traces, which are processed to generate a reflectivity image of the underground structure 124 and, in particular, the location of reflectors 126 and the nature of rock layers, which experts associate with the likelihood of oil and/or gas presence. Although FIG. 1A illustrates a marine streamer seismic acquisition system, a water-bottom seismic or a land seismic acquisition system is similar to the marine seismic acquisition system in the sense that the water-bottom seismic system has seismic sensors distributed over the water bottom surface, while the land seismic data acquisition system has seismic sensors distributed over land surface, and seismic sources (e.g., vibrators) are moved by trucks from place to place to generate seismic waves.

Remotely detecting information about fractures and the stress field is an important objective in the development of unconventional and tight hydrocarbon reservoirs. Fractures are defined as cracks in rock that typically have apertures of a few millimeters or less. Fractures and stress cause the earth to become anisotropic, which is seismically observable. Fluid-filled fractures respond somewhat like a spring to a seismic wave as it passes across them if the seismic wave is perpendicular to the fracture. A seismic wave traveling parallel to fractures does not encounter the same spring-like behavior. Therefore, seismic waves traveling in different directions measure different rock velocities when a layer contains fractures.

The fractures' presence and their orientation can be inferred by observing the P-wave seismic amplitude variation with offset and azimuth (AVOAz). Conventional seismic data processing methods are unable to uniquely determine a fracture's orientation, e.g., yielding two possible solutions 90° apart. This issue is well-known in the case of near-offset AVOAz inversion, but it is also true for far-offset approximation. In both cases, azimuthal ambiguity leads to biases in other anisotropy-related parameter estimates.

Thus, there is a need to develop new seismic data processing methods that overcome the fracture orientation ambiguity issue.

SUMMARY

Both near-offset and far-offset seven-parameter AVOAz inversions yield a 90° azimuth ambiguity for a fracture's orientation. In various embodiments this ambiguity, which biases the other parameter estimates, is reduced by imposing geologic constraints including: the regional stress field, fracture constraints, continuity constraints and empirical relations linking the anisotropic parameters.

According to an embodiment, there is a method for characterizing a fracture in an underground structure. The method includes receiving seismic data acquired during a seismic survey of the underground structure, as well as additional geological information, and generating common midpoint, CMP, gathers of traces from the seismic data. For each interface encountered by traces in one of the CMP gathers, angle-dependent azimuthal Fourier coefficients are estimated and then used to perform a nonlinear inversion of amplitude versus offset and azimuth equations to determine possible orientations of a fracture's symmetry axis. One of the possible orientations is selected using constraints based on the additional information. An image of the underground structure then includes the fracture with the selected orientation.

According to another embodiment there is a seismic data processing apparatus configured to obtain an image of a fracture in an underground structure probed using seismic waves. The apparatus includes an interface configured to receive seismic data acquired during a seismic survey of the underground structure, and additional geological information, one or more processors and a display. The one or more processors configured to generate common midpoint, CMP, gathers of traces from the seismic data, and then, for each interface encountered by traces in at least one of the CMP gathers, to estimate angle-dependent azimuthal Fourier coefficients, FCs, to perform a nonlinear inversion of amplitude versus offset and azimuth, AVOAz, equations built using the angle-dependent azimuthal FCs to determine possible fracture orientations, and to select one of the possible fracture orientations using constraints based on the additional information. The display is configured to display reflectivity in vertical slices of the underground structure, including the fracture with the selected one of the possible fracture orientations.

According to yet another embodiment, there is a non-transitory computer-readable recording medium storing executable codes which, when executed by a computer, make the computer perform a method for characterizing a fracture in an underground structure. The method includes receiving seismic data acquired during a seismic survey of the underground structure, as well as additional geological information, and generating common midpoint, CMP, gathers of traces from the seismic data. For each interface encountered by traces in one of the CMP gathers, angle-dependent azimuthal Fourier coefficients are estimated and then used to perform a nonlinear inversion of amplitude versus offset and azimuth equations to determine possible orientations of a fracture's symmetry axis. One of the possible orientations is selected using constraints based on the additional information. An image of the underground structure then includes the fracture with the selected orientation.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 1A is a schematic diagram of a conventional marine seismic data acquisition system having a horizontal streamer;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In recently developed techniques (such as, but not limited to, fracking) the presence and orientation of cracks plays an important role in designing a hydrocarbons extraction plan. Thus, it is important to be able to obtain high-quality images based on the seismic data, images that adequately represent the location and orientation of fractures. The embodiments described in this section provide an improved analysis of seismic data that generates such images. The efficiency of subsequent hydrocarbons recovery is, therefore, improved. In various embodiments processing seismic data in case of transverse isotropic media with a horizontal symmetry axis (HTI) or orthorhombic anisotropic media, the ambiguity related to fracture symmetry axis orientation or to fracture normal is resolved by constraining the solution with a priori information about the horizontal stress field, rock physics and continuity constraints. Having solved this ambiguity, it is then possible to make unbiased estimates of other anisotropy-related parameters.

Figure 1B:
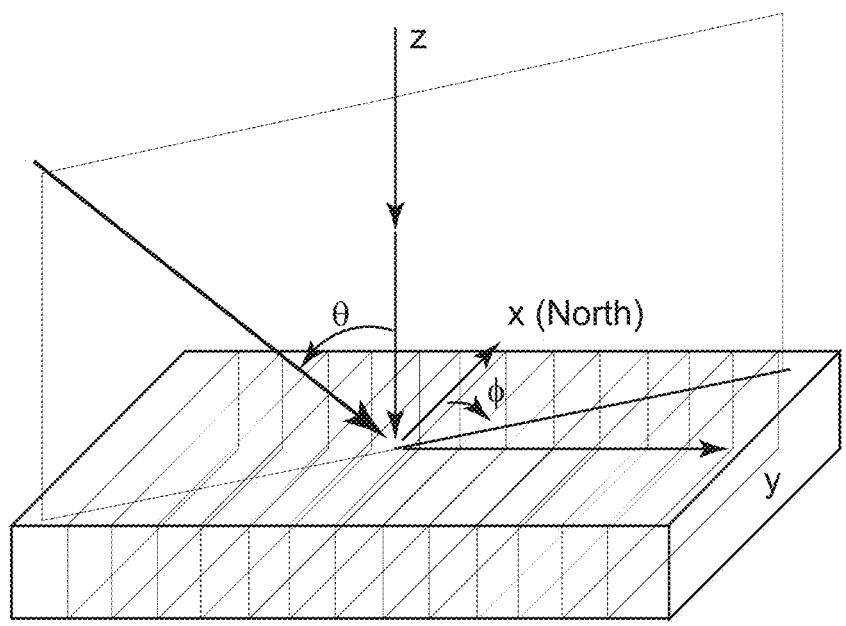
FIG. 1B is diagram describing geometry of raypath at a reflector.
Figure 2:
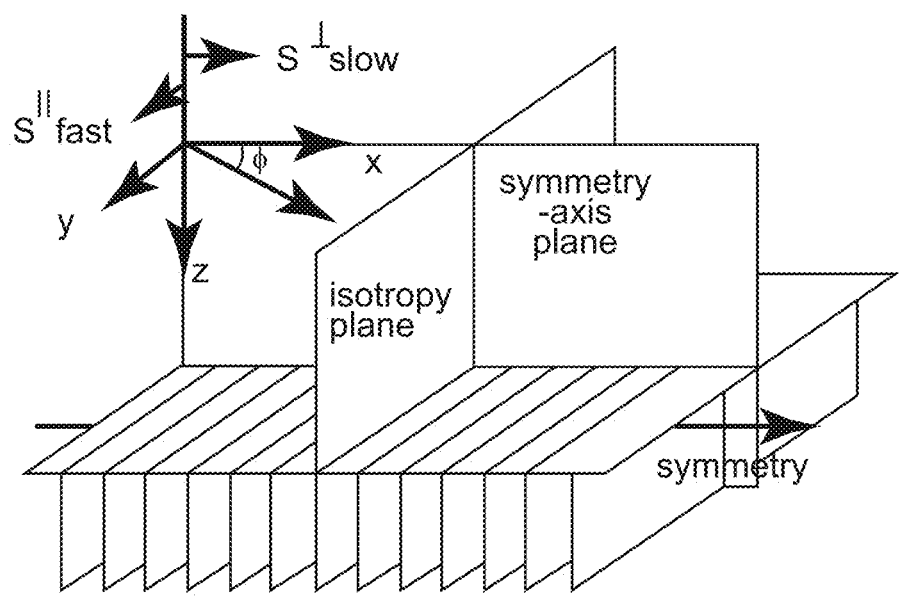
FIG. 2 is a diagram illustrating the symmetry axis concept.

In anisotropic media, the P-wave and S-wave velocities depend on orientation. Anisotropic media is generally described by 21 parameters, but this can be quite difficult to measure experimentally and to work with in practice. One useful approximation is that of transverse isotropic media with a horizontal symmetry axis (HTI). This form of anisotropy is useful in modeling both fracture- and stress-induced anisotropy. In the 1986 article entitled, "Weak elastic anisotropy," L. Thomsen (the entire content of which is incorporated herein by reference) demonstrates that velocity is isotropic within the fracture or isotropy plane for a set of vertical rotationally symmetric fractures. The perpendicular to this isotropy plane is called the symmetry axis, as illustrated in FIG. 2. The symmetry axis specifies the orientation of transverse isotropic media with a horizontal symmetry axis (HTI). In the case of a set of vertical fractures in a background isotropic media, the fracture strike corresponds to the isotropy plane, while the fracture normal corresponds to the symmetry axis. The orientation of the fracture may thus be characterized by either the isotropy plane or the symmetry axis azimuth. In the case of compliant vertical fractures, the fast orientation corresponds to an isotropy plane or fracture strike. Stress-induced anisotropy resulting from uniaxial compression also gives rise to HTI anisotropy. In this case, the fast direction corresponds to the maximum stress orientation.

Orthorhombic anisotropy (in particular, rotationally asymmetric vertical fractures in an isotropic, VFI, background media) is another situation considered in some embodiments. Although orthorhombic media does not have a symmetry axis, for ease of discussion, the fracture normal and symmetry axis are used interchangeably in this document.

As already mentioned, fractures can be detected using seismic P-wave azimuthal amplitude variation with offset (AVO) technique, due to their anisotropic signature. Under the assumption of HTI media, P-wave azimuthal reflectivity is often described using the near-offset Rüger equation (set forth in A. Rüger's 1998 article entitled, "Variation of P-wave reflectivity with offset and azimuth in anisotropic media," published in *Geophysics* No. 63, pp. 935-947, the entire content of which is incorporated herein by reference). In addition to the parameters typically estimated by AVO, the near-offset Rüger equation also estimates the anisotropic gradient $B_{ani}$ and symmetry axis azimuth $\phi_{sym}$. These two parameters may be used to remotely predict fracture intensity and orientation, respectively.

The symmetry axis has been estimated by solving the general linearized AVOAz equation under the assumption of vertical fractures in an isotropic (VFI) background media.

Figure 3:
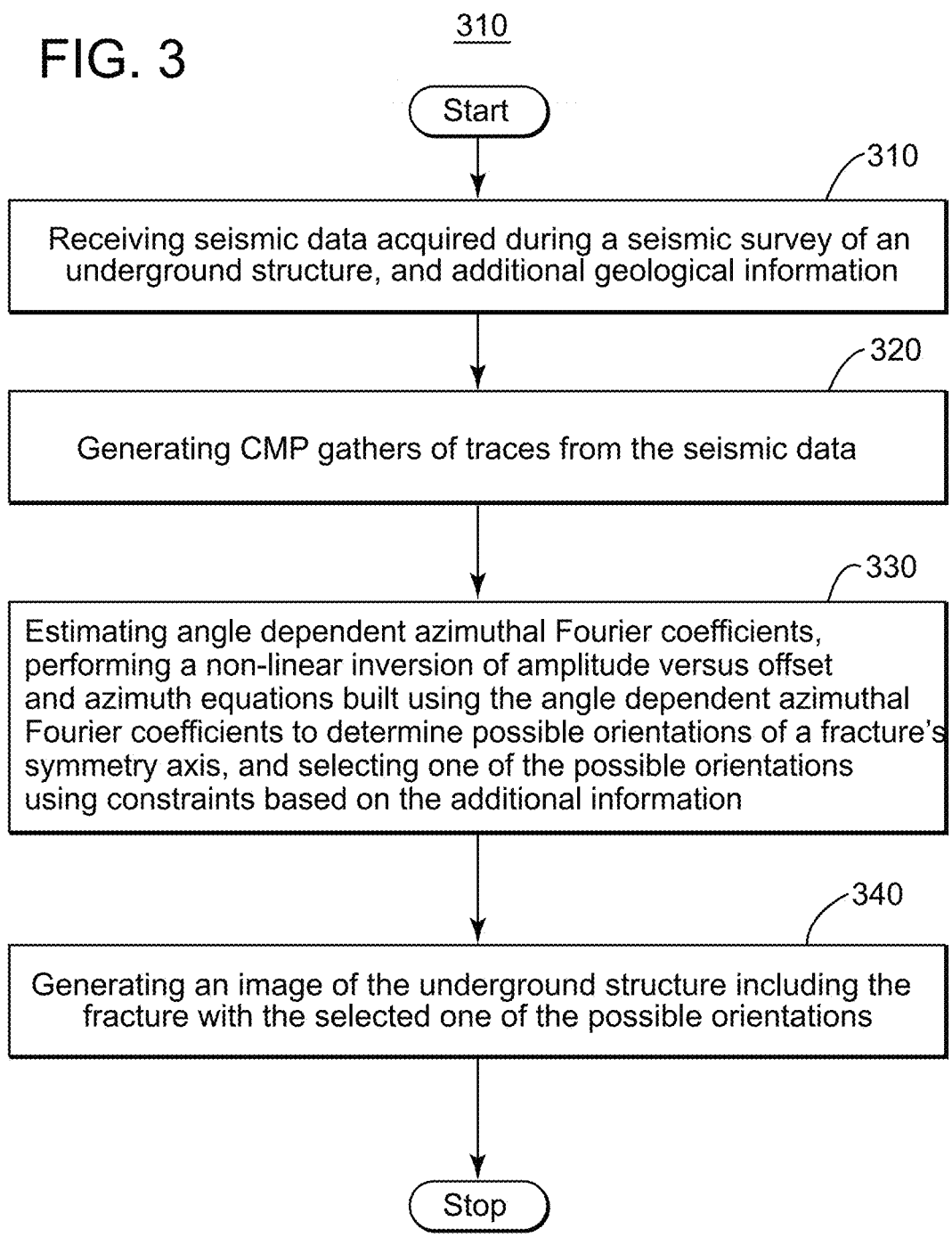
FIG. 3 is a flowchart of a method according to an embodiment.

FIG. 3 is a flowchart of a method 300 for determining fracture orientation or a maximum horizontal stress orientation based on AVOAz analysis and geologic constraints. Method 300 includes receiving seismic data acquired during a seismic survey of an underground structure, as well as additional geological information at 310. The additional geological information may be any one of the following (yet not limited to the ones listed here): whether near-field or far-field data is used, whether the media surrounding the fractures is a transverse isotropic media or an orthorhombic anisotropic media, the stress field, a localized stress constraint, whether the penny shape or symmetric fracture constraints are to be used, whether other empirical constraints have to be met, whether a continuity constraint has to be met.

Method 300 further includes generating common midpoint (CMP) gathers of traces from the seismic data at 320. The term "CMP gathers" should not be interpreted narrowly as including only the traces before migration, as it is intended to also refer to image gathers after migration, for the same location. The image gathers carry the incident and azimuth angle information.

In these CMP gathers, x distances and depths determine incidence angles, x distances and offsets y determine the azimuth angles.

Then, at 330, for at least one interface traversed by traces in a CMP gather, a set of the following steps is performed:
  estimating angle-dependent azimuthal Fourier coefficients (FC),
  determining possible fracture orientations from solutions of a nonlinear inversion of AVOAz equation formed using the estimated angle-dependent azimuthal FC, and
  selecting one of the possible orientations using the additional geological information.

Processing such as that outlined above may be applied for all the interfaces in a CMP gather and all CMP gathers in a data set.

Method 300 then includes generating an image of the underground structure including the fracture with the selected one of possible orientations at 340.

The following description of the mathematical basis and features of different embodiments starts with reviewing the linearized AVO in isotropic media and then azimuthal AVO in transverse isotropic media with a horizontal symmetry axis (HTI). The linearized AVOAz expression is then written in terms of azimuthal Fourier coefficients FCs in order to decompose the problem into simpler parts for analysis and generalize the problem to orthorhombic media. The solution of the near-offset linearization is next reviewed with the objective of introducing symmetry axis ambiguity. It is shown that a priori knowledge of the regional stress field may be used to preferentially choose one solution over the other. Having reviewed the near-offset case, the more complex seven-parameter linearized AVOAz inversion is discussed and shown to exhibit the same ambiguity. Various embodiments use extra information coming from the far offsets along with rock physics constraints to resolve the problem. Several different rock physics models are discussed and used to constrain the problem. Lastly, continuity constraints are introduced to help stabilize the solution in the presence of noise and poor signal.

Amplitude Variation with Offset

The AVOAz response may be separated into AVO and AVAz parts.

The linearized AVO or, more precisely, AVA P-wave reflectivity in isotropic media is given by $$R(\theta) = A + B \sin^2 \theta + C \sin^2 \theta \tan^2 \theta. \tag{1}$$

Reflectivity is a function of the angle of incidence θ on the interface, the intercept, A, the gradient, B, and the curvature, C, that are linear combinations of the fractional material contrasts across a simple interface. In isotropic media these are defined as $$A = \frac{\Delta V_p}{2\overline{V}_p} + \frac{\Delta \rho}{2\overline{\rho}}, \tag{2}$$

$$B_{iso} = \frac{\Delta V_p}{2\overline{V}_p} - 4\frac{\overline{V}_s^2}{\overline{V}_p^2}\left[\frac{\Delta V_s}{\overline{V}_s} + \frac{\Delta \rho}{2\overline{\rho}}\right], \tag{3}$$

$$C_{iso} = \frac{\Delta V_p}{2\overline{V}_p}, \tag{4}$$

where ρ, $v_p$, $v_s$, are the density, P-wave and S-wave velocities. In these equations, the symbol Δ denotes a difference of a property across the interface where the reflection occurs, and an overbar represents the average of the property across the interface.

Amplitude Variation with Offset and Azimuth in HTI Media

In HTI media, the amplitude also varies as a function of azimuth $\phi$. The linearized P-wave reflectivity at the interface between two HTI media which share the same symmetry axis $\phi_{sym}$ is (as set for the in Rüger's 1998 article)

$$R(\phi, \theta) = \frac{\Delta Z}{2\bar{Z}} + \frac{1}{2}\left(\left[\frac{\Delta}{V_p} - \left(2\frac{\bar{V}_s}{\bar{V}_p}\right)^2 \frac{\Delta G}{G}\right] + \left[\Delta\delta^{(v)} + 8\left(\frac{\bar{V}_s}{\bar{V}_p}\right)^2 \Delta\gamma\right]\cos^2(\phi - \phi_{sym})\right) \sin^2\theta + \left(\frac{\Delta V_p}{2\bar{V}_p} + \frac{1}{2}(\Delta\varepsilon^{(v)}\cos^2(\phi - \phi_{sym}) + \Delta\delta^{(v)}\sin^2(\phi - \phi_{sym}))\right) \cos^2(\phi - \phi_{sym})\right)\sin^2\theta\tan^2\theta \quad (5)$$

where $Z=\rho V_p$ is the vertical P-wave impedance, and $G=\rho V_s^2$ is the shear modulus. The superscript (v) on the fractional Thomsen parameters (defined in the already-cited Thomsen 1986 article) indicate that $\varepsilon^{(v)}$ and $\delta^{(v)}$ are referenced to the vertical axis rather than the symmetry axis. Table 1 in Rüger's 1998 article describes the transformations between the two parameterizations. Using the linearized approximation $\gamma \approx -\gamma^{(v)}$, equation (5) is sometimes written in terms of $\gamma^{(v)}$ as $$R(\phi, \theta) = \frac{\Delta Z}{2\bar{Z}} + \frac{1}{2}\left(\left[\frac{\Delta V_p}{\bar{V}_p} - \left(2\frac{\bar{V}_s}{\bar{V}_p}\right)^2 \frac{\Delta G}{G}\right] + \left[\Delta\delta^{(v)} - 8\left(\frac{\bar{V}_s}{\bar{V}_p}\right)^2 \Delta\gamma^{(v)}\right]\cos^2(\phi - \phi_{sym})\right) \sin^2\theta + \left(\frac{\Delta V_p}{2\bar{V}_p} + \frac{1}{2}(\Delta\varepsilon^{(v)}\cos^2(\phi - \phi_{sym}) + \Delta\delta^{(v)}\sin^2(\phi - \phi_{sym}))\right) \cos^2(\phi - \phi_{sym})\right)\sin^2\theta\tan^2\theta \quad (6)$$

Although less accurate than equation (5), equation (6) is used subsequently because it can be rewritten in terms of the fracture weakness parameters without further approximations.

The near-offset approximation $$R(\phi,\theta) = A + (B_{iso} + B_{ani}\cos^2(\phi - \phi_{sym}))\sin^2\theta, \quad (7)$$

is used to infer the parameters from the real AVOAz seismic data. Equation (7) is parameterized in a similar fashion as the isotropic AVA equation using $$B_{iso} = \frac{1}{2}\left[\frac{\Delta V_p}{\bar{V}_p} - \left(2\frac{\bar{V}_s}{\bar{V}_p}\right)^2 \frac{\Delta G}{G}\right] = \frac{\Delta V_p}{2\bar{V}_p} - 4\frac{\bar{V}_s^2}{\bar{V}_p^2}\left[\frac{\Delta V_s}{\bar{V}_s} + \frac{\Delta\rho}{2\bar{\rho}}\right], \quad (8)$$

and $$B_{ani} = \frac{1}{2}\left[\Delta\delta^{(v)} - 8\left(\frac{\bar{V}_s}{\bar{V}_p}\right)^2 \Delta\gamma^{(v)}\right]. \quad (9)$$

The near-offset Rüger approximation enables obtaining two more parameter estimates than two-term AVO inversion: the anisotropic gradient $B_{ani}$ and the symmetry axis azimuth $\phi_{sym}$. A non-zero anisotropic gradient implies that the media is anisotropic. The interpretation is, however, complicated by the fact that $B_{ani}$ is a weighted difference of the Thomsen parameters $\delta^{(v)}$ and $\gamma^{(v)}$, which may cancel each other out. Bakulin's 2000 article (entitled, "Estimation of fracture parameters from reflection seismic data—Part I: HTI model due to a single fracture set," and published in *Geophysics*, Vol. 65, No. 6, pp. 1788-1802, the entire content of which is incorporated herein by reference) introduces a formula expressing the anisotropic gradient in terms of fracture weakness parameters.

Further complicating the interpretation is that the solution for $B_{ani}$ and $\phi_{sym}$ is not unique. The nonlinear inversion of equation (7) results in two solutions which fit the data equally well. Estimating $B_{ani}$ involves taking the square root of an intermediate result, thus introducing a sign ambiguity. Choosing the wrong sign for $B_{ani}$ introduces a 90° shift to the estimate of $\phi_{sym}$ and biases $B_{iso}$.

Parameterizing Reflectivity

The linearized seven-parameter P-wave AVOAz reflectivity R as a function of incidence angle $\theta$ and azimuth $\phi$ for HTI and VFI media can be written as the truncated Fourier series $$R(\phi,\theta) = r_0(\theta) + r_2(\theta)\cos(2(\phi - \phi_{sym})) + r_4(\theta)\cos(4(\phi - \phi_{sym})). \quad (10)$$

The phase of the sinusoids is controlled by the symmetry axis azimuth $\phi_{sym}$. The magnitudes $r_0$, $r_2$ and $r_4$ of the sinusoids of periodicity n=0, 2 and 4 in equation (10) are $$r_0(\theta) = A_0 + B_0 \sin^2\theta + C_0 \sin^2\theta \tan^2\theta, \quad (11)$$

$$r_2(\theta) = B_2 \sin^2\theta + C_2 \sin^2\theta \tan^2\theta, \quad (12)$$

$$r_4(\theta) = C_4 \sin^2\theta \tan^2\theta, \quad (13)$$

where the definitions of the parameters $A_0$, $B_0$, $C_0$, $B_2$, $C_2$ and $C_4$ depend on the form of the anisotropy and are described in Downton and Roure's 2015 article entitled, "Interpreting azimuthal Fourier coefficients for anisotropic and fracture parameters," published in *Interpretation* (3), pp. ST9-ST27, the entire content of which is incorporated by reference.

Parameters $B_2$, $C_2$ and $C_4$ control the amplitude variation with azimuth (AVAz). In HTI media, $B_2=0.5 B_{ani}$, $C_2=0.25\Delta\varepsilon^{(v)}$ and $C_4=\frac{1}{16}\Delta\eta^{(v)}$, which may be written in the matrix form as $$\begin{bmatrix} B_2 \\ C_2 \\ C_4 \end{bmatrix} = \begin{bmatrix} \frac{1}{2} & 0 & 0 \\ 0 & \frac{1}{4} & 0 \\ 0 & 0 & \frac{1}{16} \end{bmatrix} \begin{bmatrix} B_{ani} \\ \Delta\varepsilon^{(v)} \\ \Delta\eta^{(v)} \end{bmatrix}. \quad (14)$$

Parameter $B_{ani}$ is the anisotropic gradient, $\varepsilon^{(v)}$ is the Thomsen parameter describing the P-wave anisotropy, and $\eta^{(v)}$ is the anellipticity, which is related to the Thomsen parameters by the formula $$\eta^{(v)} = \frac{\varepsilon^{(v)} - \delta^{(v)}}{1 + 2\delta^{(v)}}. \quad (15)$$

Upon substituting the definition of $B_{ani}$ from (9) and $\eta^{(v)}$ from (15), the transformation matrix in (14) can be rewritten in terms of Thomsen parameters:

$$\begin{bmatrix} B_2 \\ C_2 \\ C_4 \end{bmatrix} = \begin{bmatrix} \frac{1}{4} & 0 & -2g \\ 0 & \frac{1}{4} & 0 \\ -\frac{1}{16} & \frac{1}{16} & 0 \end{bmatrix} \begin{bmatrix} \Delta\delta^{(v)} \\ \Delta\varepsilon^{(v)} \\ \Delta\gamma^{(v)} \end{bmatrix}. \quad (16)$$

Equation (16) is useful as a constraint and can also be used to show the equivalence of the FC formulation (10 to 13) and the Rüger equation (6).

It is known in the art that the parameters $B_2$, $C_2$ and $C_4$ can be expressed in terms of fracture weakness parameters in the case of vertical fractures in an isotropic (VFI) media. Rotationally asymmetric fractures give rise to orthorhombic anisotropy. The medium is described by the vertical, horizontal and normal fracture weakness parameters $\delta_V$, $\delta_H$, and $\delta_N$, respectively. The transformation linking these parameters is $$\begin{bmatrix} B_2 \\ C_2 \\ C_4 \end{bmatrix} = \begin{bmatrix} \frac{1}{2}g & 0 & -\frac{1}{2}(1-2g)g \\ 0 & 0 & -\frac{1}{2}g(1-g) \\ 0 & \frac{1}{8}g & -\frac{1}{8}g^2 \end{bmatrix} \begin{bmatrix} \Delta\delta_V \\ \Delta\delta_H \\ \Delta\delta_N \end{bmatrix}, \quad (17)$$

where $g=(V_s/V_p)^2$ of the background media. The case of rotationally symmetric fractures gives rise to HTI anisotropy. In this case, both the vertical and horizontal fracture weaknesses are equal and are replaced by the single parameter, tangential fracture weakness $\delta_T$.

Calculating the Azimuthal Fourier Coefficients

In equation (10) the Fourier series is written in terms of magnitude and phase. In calculating the FCs it is more convenient to write the Fourier series as the weighted sum of cosine and sine waves $$R(\phi, \theta) = \sum_{n=0}^{\infty} (u_n(\theta)\cos(n\phi) + v_n(\theta)\sin(n\phi)). \quad (18)$$

For the case of N regularly sampled data, the cosine coefficients, $u_n$, are calculated using $$u_n(\theta) = \frac{1}{\pi}\sum_{k=1}^{N} R_k(\phi, \theta)\cos(n\phi)d\phi, \quad (19)$$

while the sine coefficients, $v_n$, are calculated using $$v_n(\theta) = \frac{1}{\pi}\sum_{k=1}^{N} R_k(\phi, \theta)\sin(n\phi)d\phi, \quad (20)$$

for integer values of n such that n≥0. These parameters can be transformed to magnitude $$r_n(\theta) = \sqrt{u_n^2(\theta) + v_n^2(\theta)}, \quad (21)$$

and phase $$\phi_n(\theta) = \frac{1}{n}\arctan\left(\frac{v_n(\theta)}{u_n(\theta)}\right). \quad (22)$$

In practice, the workflow for calculating the FCs depends on the geometry of the data. The simplest case is for regularly sampled data in azimuth, such as the output of an azimuthally sectored migration. If necessary, the seismic data is transformed from offset to angle of incidence for each azimuth sector. Then the data is grouped by angle of incidence. For each incidence angle, equations (19) and (20) are used to calculate the angle-dependent azimuthal FCs. The magnitude and phase can, in turn, be calculated using equations (21) and (22). This is done for each CDP location and time sample. Downton and Roure's 2015 article describe how to determine the azimuthal FCs for other geometries.

AVOAz Inversion

In order to solve the AVOAz inverse problem, it is easier to write the Fourier series in terms of the cosine and sine functions similar to equation (18). Rewriting equation (10) in terms of angle dependent functions $u_n(\theta)$ and $v_n(\theta)$ leads to $$\begin{bmatrix} u_0(\theta) \\ u_2(\theta) \\ v_2(\theta) \\ u_4(\theta) \\ v_4(\theta) \end{bmatrix} = \begin{bmatrix} 1 & x & z & 0 & 0 & 0 \\ 0 & 0 & 0 & x\cos(2\phi_{sym}) & z\cos(2\phi_{sym}) & 0 \\ 0 & 0 & 0 & x\sin(2\phi_{sym}) & z\sin(2\phi_{sym}) & 0 \\ 0 & 0 & 0 & 0 & 0 & z\cos(4\phi_{sym}) \\ 0 & 0 & 0 & 0 & 0 & z\sin(4\phi_{sym}) \end{bmatrix} \begin{bmatrix} A_0 \\ B_0 \\ C_0 \\ B_2 \\ C_2 \\ C_4 \end{bmatrix}. \quad (23)$$

Equation (23) shows that the amplitude variation with offset (AVO) and AVAz parts of the problem are decoupled. In equation (23), the left-hand side vectors are functions of incidence angle $\theta$ with $x=\sin^2\theta$, and $z=\sin^2\theta\tan^2\theta$. Although written as a set of linear equations, equation (23) is actually nonlinear due to the $\phi_{sym}$ dependence in the linear operator. This nonlinear inverse problem can be solved either iteratively or by using some line search technique. A brute-force method to solve this system of equations is to iterate over all possible values of $\phi_{sym}$, solving the least squares problem for each possible $\phi_{sym}$. The solution corresponding to the $\phi_{sym}$ with minimum misfit is the local solution.

The solution of equation (23) is bimodal and, hence, not unique. This is more obvious if only the equations describing the AVAz are considered, namely, $$\begin{bmatrix} u_2(\theta) \\ v_2(\theta) \\ u_4(\theta) \\ v_4(\theta) \end{bmatrix} = \begin{bmatrix} x\cos(2\phi_{sym}) & z\cos(2\phi_{sym}) & 0 \\ x\sin(2\phi_{sym}) & z\sin(2\phi_{sym}) & 0 \\ 0 & 0 & z\cos(4\phi_{sym}) \\ 0 & 0 & z\sin(4\phi_{sym}) \end{bmatrix} \begin{bmatrix} B_2 \\ C_2 \\ C_4 \end{bmatrix}. \quad (24)$$

Due to the periodicity of the trigonometric functions, it can be seen by substitution that both $(\hat{\phi}_{sym}, +\hat{B}_2, +\hat{C}_2, \hat{C}_4)$ and $(\hat{\phi}_{sym}+\pi/2, -\hat{B}_2, -\hat{C}_2, \hat{C}_4)$ fit the data equally well.

In the near-offset approximation, the z terms are ignored, resulting in $$\begin{bmatrix} u_2(\theta) \\ v_2(\theta) \end{bmatrix} = \begin{bmatrix} x\cos(2\phi_{sym}) \\ x\sin(2\phi_{sym}) \end{bmatrix} [B_2]. \tag{25}$$

Figure 4:
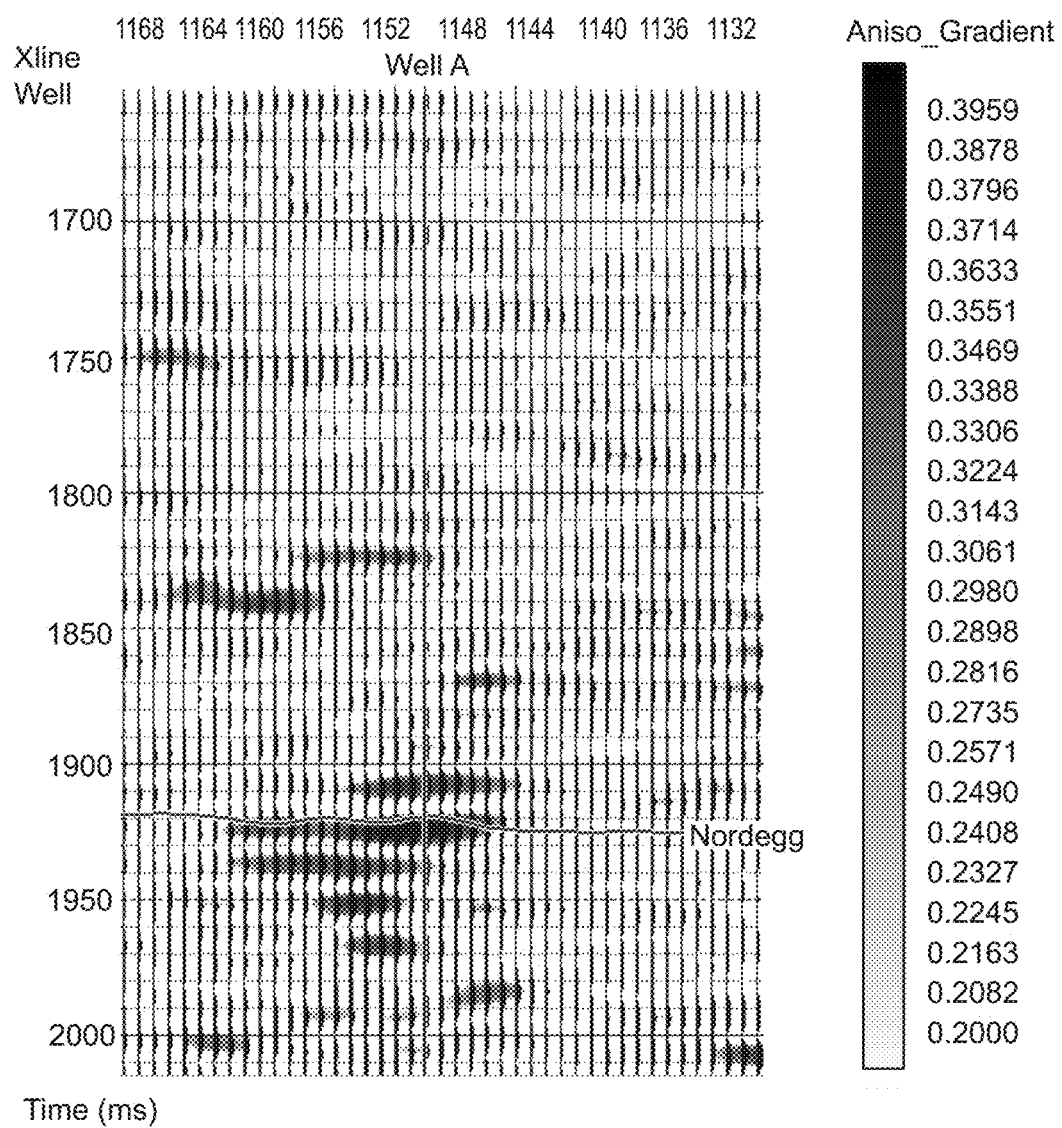
FIG. 4 is an inline profile of the near-offset Rüger estimate of the anisotropic gradient $B_{ani}$.
Figure 5:
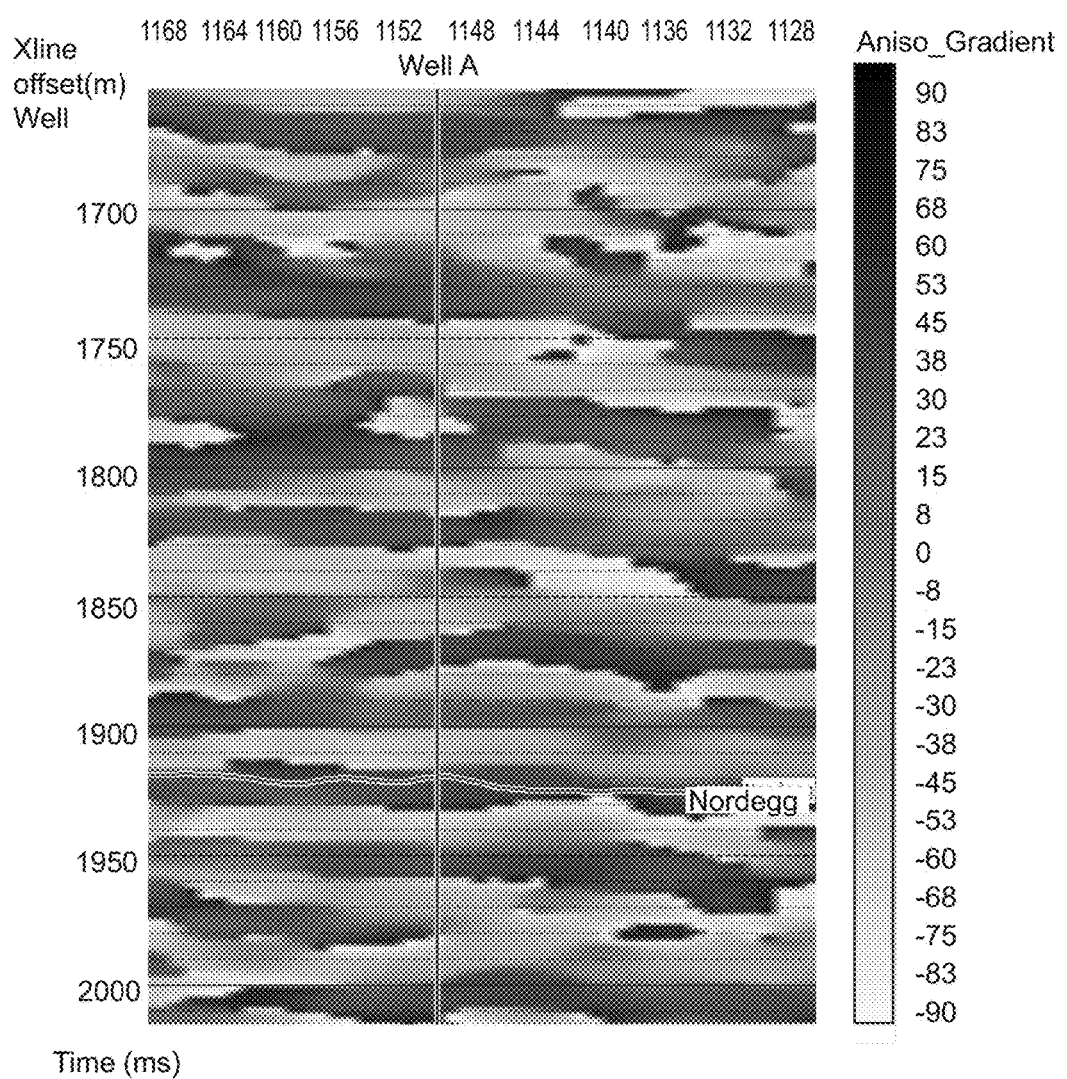
FIG. 5 is an inline profile of the symmetry axis azimuth $\phi_{sym}$ corresponding to the positive $B_{ani}$ solution.

In this simpler case, it can be seen by substitution that both ($\hat{\phi}_{sym}$, +0.5$\hat{B}_{ani}$) and ($\hat{\phi}_{sym}$+π/2, −0.5$\hat{B}_{ani}$) give equivalent solutions. Typically, only one of the solutions is retained and output. FIG. 4 shows the near-offset Rüger estimate of the anisotropic gradient $B_{ani}$ (in nuances of gray) for a seismic inline plane (x-axis is the CMP location and y axis is time). Line labeled "Nordegg" represents an estimate of the top of the reservoir. FIG. 5 is similarly an inline profile of the symmetry axis azimuth $\phi_{sym}$ corresponding to the positive $B_{ani}$ solution for the same 3D seismic inline. The azimuth solution oscillates 90° between different layers and, hence, appears geologically nonphysical.

Stress Constraint

Figure 6:
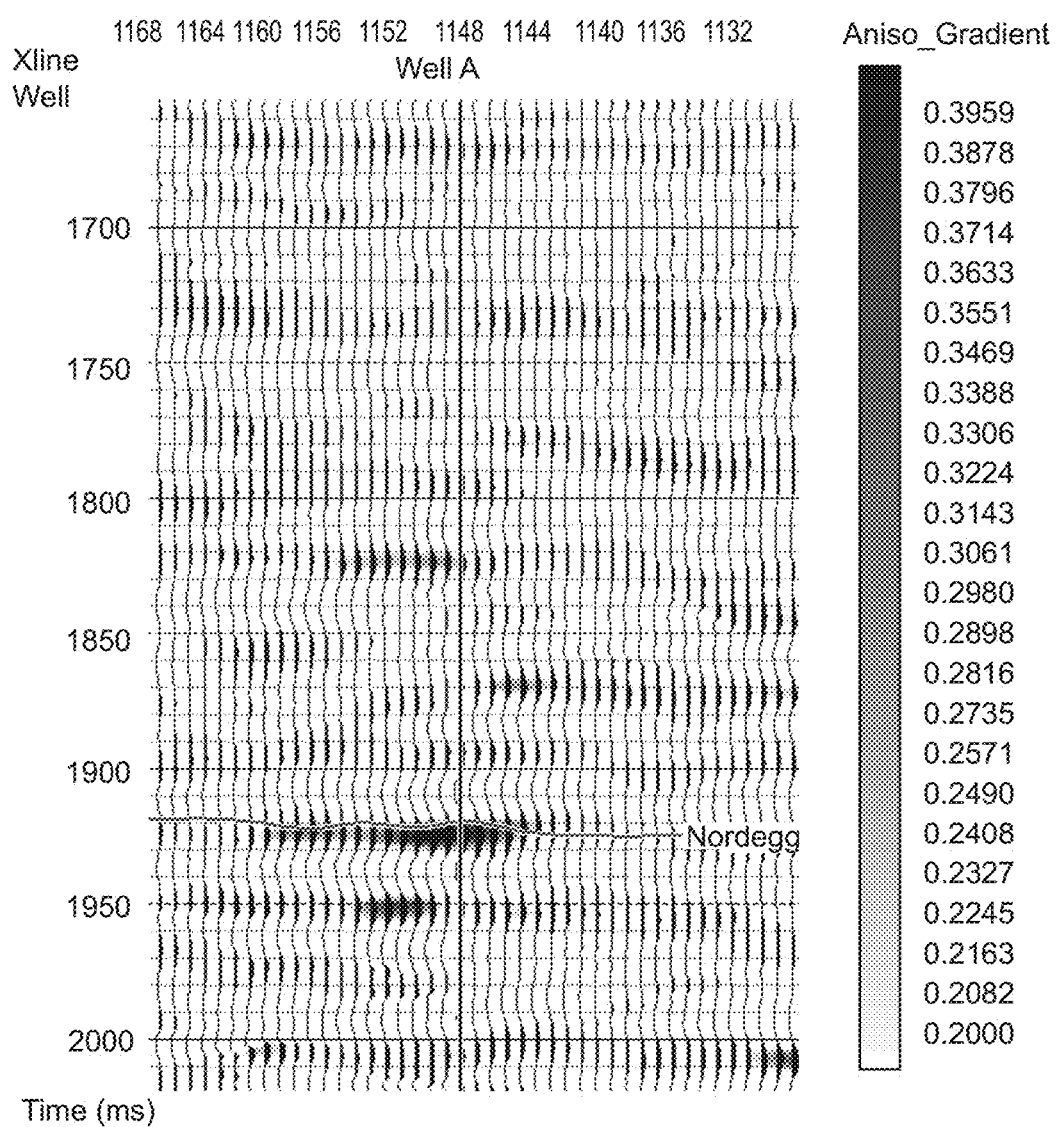
FIG. 6 is an inline profile of the near-offset Rüger estimate of the anisotropic gradient $B_{ani}$ obtained using a method according to an embodiment.
Figure 7:
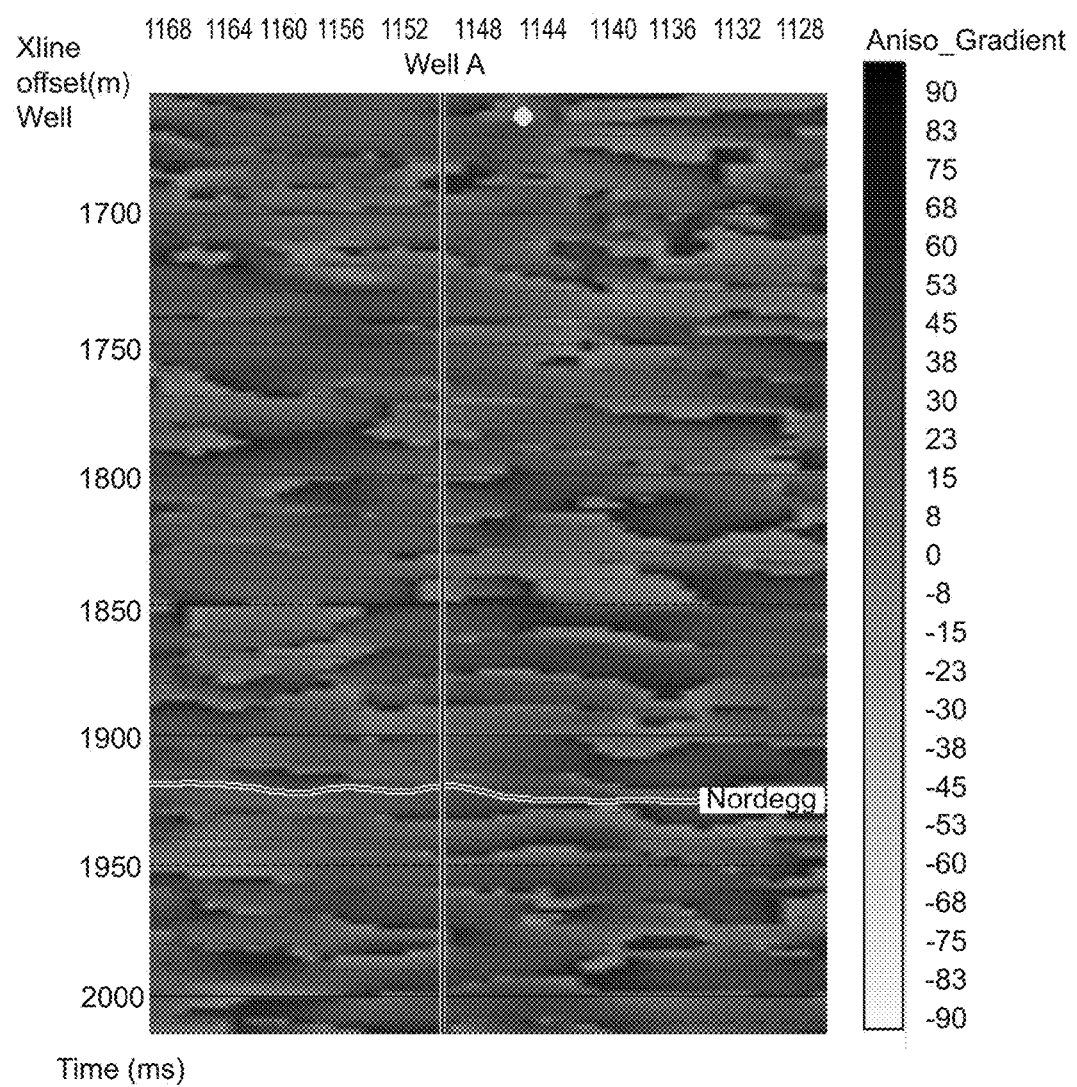
FIG. 7 is a chart of the symmetry axis azimuth $\phi_{sym}$ obtained using a method according to an embodiment.

The stress field changes slowly in a regional sense. For stress-induced anisotropy, this implies that the orientation of the anisotropy should also vary slowly. In this case, the fast direction (see FIG. 2) corresponds to the direction of maximum horizontal stress. If this orientation is known from local well control or from the available world stress map, then the orientation of the regional stress field may be used to choose one solution over the other in the AVOAz inversion. For example, of the two solutions of the near-offset Rüger equation ($\hat{\phi}_{sym}$, +0.5$\hat{B}_{ani}$) and ($\hat{\phi}_{sym}$+π/2, −0.5$\hat{B}_{ani}$), it is chosen for which the isotropy (fracture) plane azimuth is closest to the maximum horizontal stress direction. FIGS. 6 and 7 show the anisotropic gradient and the symmetry axis azimuth, respectively, calculated using the stress constraint to the same data sets as shown in FIGS. 4 and 5.

By definition, the constrained solution better fits the known geologic information. The estimated symmetry axis in FIG. 7 no longer rapidly changes as a function of layer, as was the case in FIG. 5. A further consequence of using the stress constraint is that the anisotropic gradient $B_{ani}$ has both positive and negative values in FIG. 6, which again are more geologically believable than the values in FIG. 4.

Figure 8:
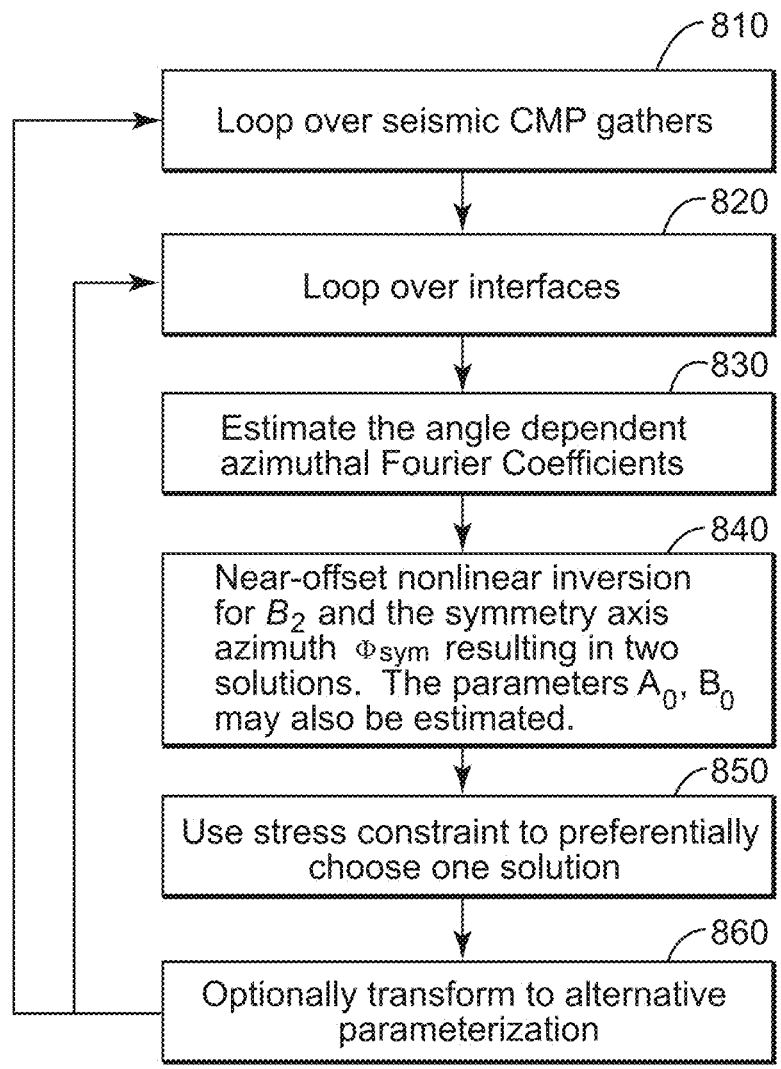
FIG. 8 is a flowchart of near-offset AVOAz inversion using stress constraints according to an embodiment.

FIG. 8 is a flowchart of near-offset AVOAz inversion using stress constraints according to an embodiment. Boxes 810 and 820 indicate looping over seismic CMP gathers and interfaces, but the processing performed in 830, 840 and 850 is independent for each CMP gather and rock layer interface. In fact, the processing performed in 830, 840 and 850 is a specific implementation of step 330 in FIG. 3.

At 830, the angle-dependent azimuthal Fourier coefficients are estimated using equations (19)-(22) as described in the previous sub-section.

At 840, a near-offset nonlinear inversion of equation (25) is performed to determine $B_2$ (see equations (9) and (14)) and the symmetry axis azimuth $\phi_{sym}$. The inversion yields two solutions and, thus, two values for $\phi_{sym}$. Parameters $A_0$ and $B_0$ may also be estimated. Then, at 850, the stress constraint is used to choose one of the $\phi_{sym}$ values. Optionally, at 860, these parameters may be converted in alternative parameterization (e.g., the anisotropic gradient and Thomsen parameters).

Similar to the near-offset case, the far-offset AVOAz inverse problem (equation 24) also has two solutions, ($\hat{\phi}_{sym}$, +$\hat{B}_2$, +$\hat{C}_2$, $\hat{C}_4$) and ($\hat{\phi}_{sym}$+π/2, −$\hat{B}_2$, −$\hat{C}_2$, $\hat{C}_4$). This is also true for the seven-parameter Azimuthal AVO inversion (equation 23). The stress constraint can be used to choose between the two solutions in this case as well.

Figure 9:
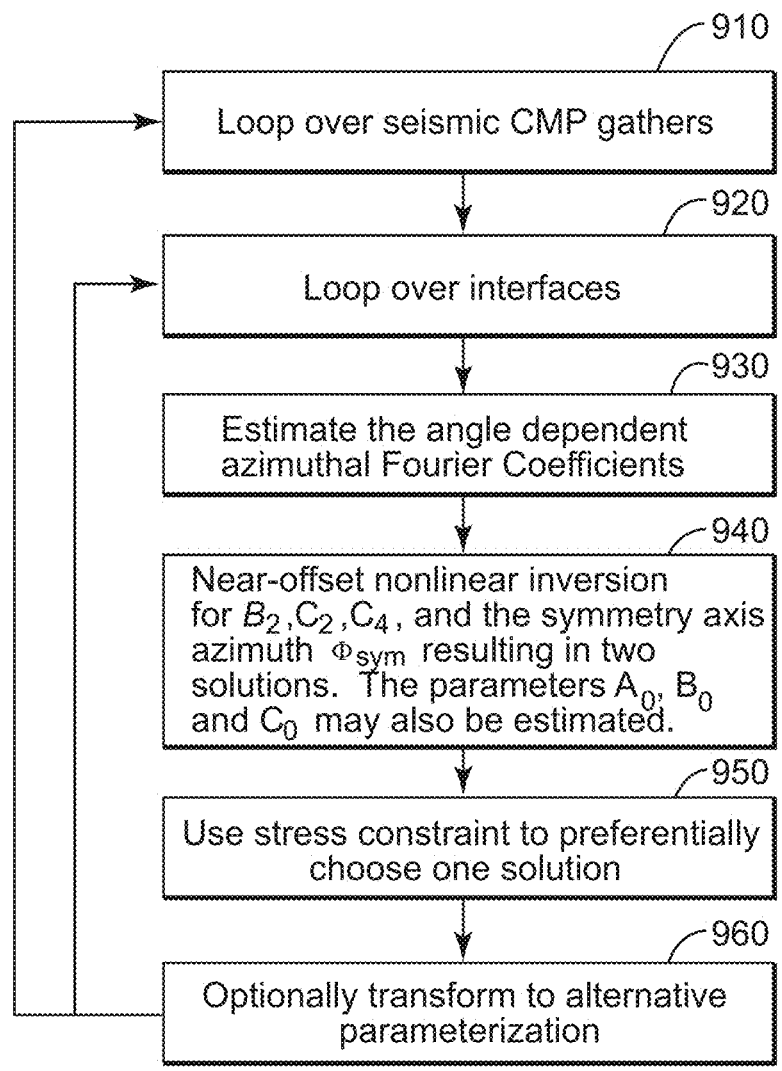
FIG. 9 is a flowchart of far-offset AVOAz inversion using stress constraints according to an embodiment.

FIG. 9 is a flowchart of far-offset AVOAz inversion using stress constraints according to an embodiment. Boxes 910 and 920 indicate looping over seismic CMP gathers and interfaces, but the processing performed in 930, 940 and 950 is independent for each CMP gather and rock layer interface. The processing performed in 930, 940 and 950 is another specific implementation of step 330 in FIG. 3.

At 930, the angle-dependent azimuthal Fourier coefficients are estimated. At 940, a far-offset nonlinear inversion of equation (23) is performed to determine $B_2$, $C_2$, $C_4$ and the symmetry axis azimuth $\phi_{sym}$. The inversion yields two solutions and, thus, two values for $\phi_{sym}$. Parameters $A_0$, $B_0$ and $C_0$ may also be estimated. Then, at 950, the stress constraint is used to choose one of the $\phi_{sym}$ values. Optionally, at 960, these parameters may be converted in alternative parameterization (e.g., the anisotropic gradient and Thomsen parameters).

Rock Physics Constraints

In the case of the far-offset inverse problem (equations 23 and 24), the extra information provided by the far offsets, $C_2$ and $C_4$, along with rock physics constraints provide an alternative way to resolve the symmetry axis azimuth ambiguity. If assumed the anisotropy is due to vertical rotationally symmetric fractures, both the vertical and horizontal fracture weaknesses are equal and are replaced by the single parameter of the tangential fracture weakness $\delta_T$, so the transformation matrix (equation 17) becomes $$\begin{bmatrix} B_2 \\ C_2 \\ C_4 \end{bmatrix} = \begin{bmatrix} \frac{1}{2}g & -\frac{1}{2}(1-2g)g \\ 0 & -\frac{1}{2}g(1-g) \\ \frac{1}{8}g & -\frac{1}{8}g \end{bmatrix} \begin{bmatrix} \Delta\delta_T \\ \Delta\delta_N \end{bmatrix}, \tag{26}$$

and equation (24) becomes $$\begin{bmatrix} u_2(\theta) \\ v_2(\theta) \\ u_4(\theta) \\ v_4(\theta) \end{bmatrix} = \tag{27}$$

$$\frac{g}{2}\begin{bmatrix} x\cos(2\phi_{sym}) & ((2g-1)x+(g-1)z)\cos(2\phi_{sym}) \\ x\sin(2\phi_{sym}) & ((2g-1)x+(g-1)z)\sin(2\phi_{sym}) \\ \frac{1}{4}z\cos(4\phi_{sym}) & -\frac{g}{4}z\cos(4\phi_{sym}) \\ \frac{1}{4}z\sin(4\phi_{sym}) & -\frac{g}{4}z\sin(4\phi_{sym}) \end{bmatrix}\begin{bmatrix} \Delta\delta_T \\ \Delta\delta_N \end{bmatrix}.$$

Symmetric Fracture Constraints

In the more general case of rotationally asymmetric fractures, a similar constraint may be used. In this case, rather than forcing $\delta_V=\delta_H$, the solution for which $\delta_V$ and $\delta_H$ are closest together is selected. A similar constraint can also be applied to the seven-parameter AVOAz inversion problem (equation 23).

Figure 10:
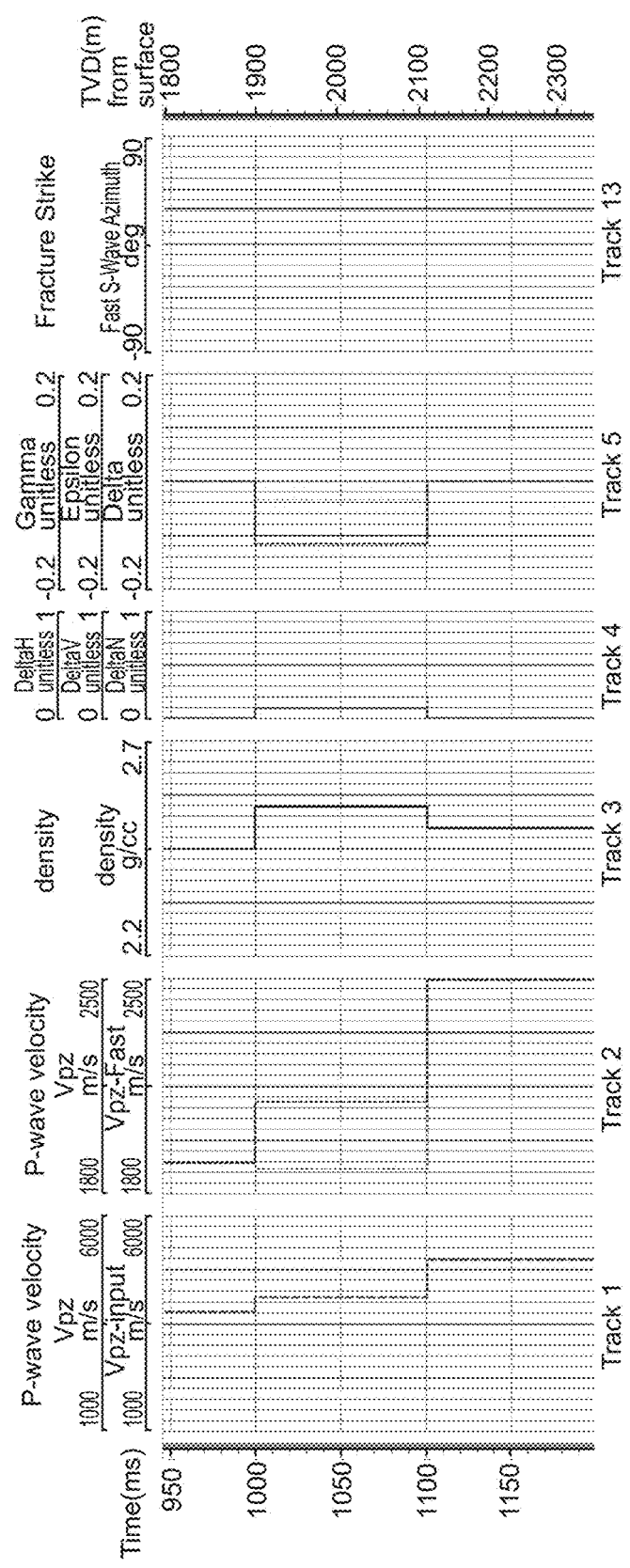
FIG. 10 is a set of graphs having a common time axis illustrating the layered model used to generate synthetic data for testing methods according to various embodiments.

The methods have been tested on synthetic data generated using the layered elastic model illustrated in FIG. 10. The model has three layers with two interfaces. The middle layer is fractured so that the contrast in fracture weakness parameters is positive for the top interface and negative for the bottom interface. The fracture strike is held constant at 30° so the symmetry axis is 120° for all layers. The synthetic is generated using a convolutional model and a bandlimited wavelet. Due to the bandlimited nature of the wavelet and change in sign at the interface, the anisotropic gradient has both positive and negative values complicating the analysis.

Figure 11:
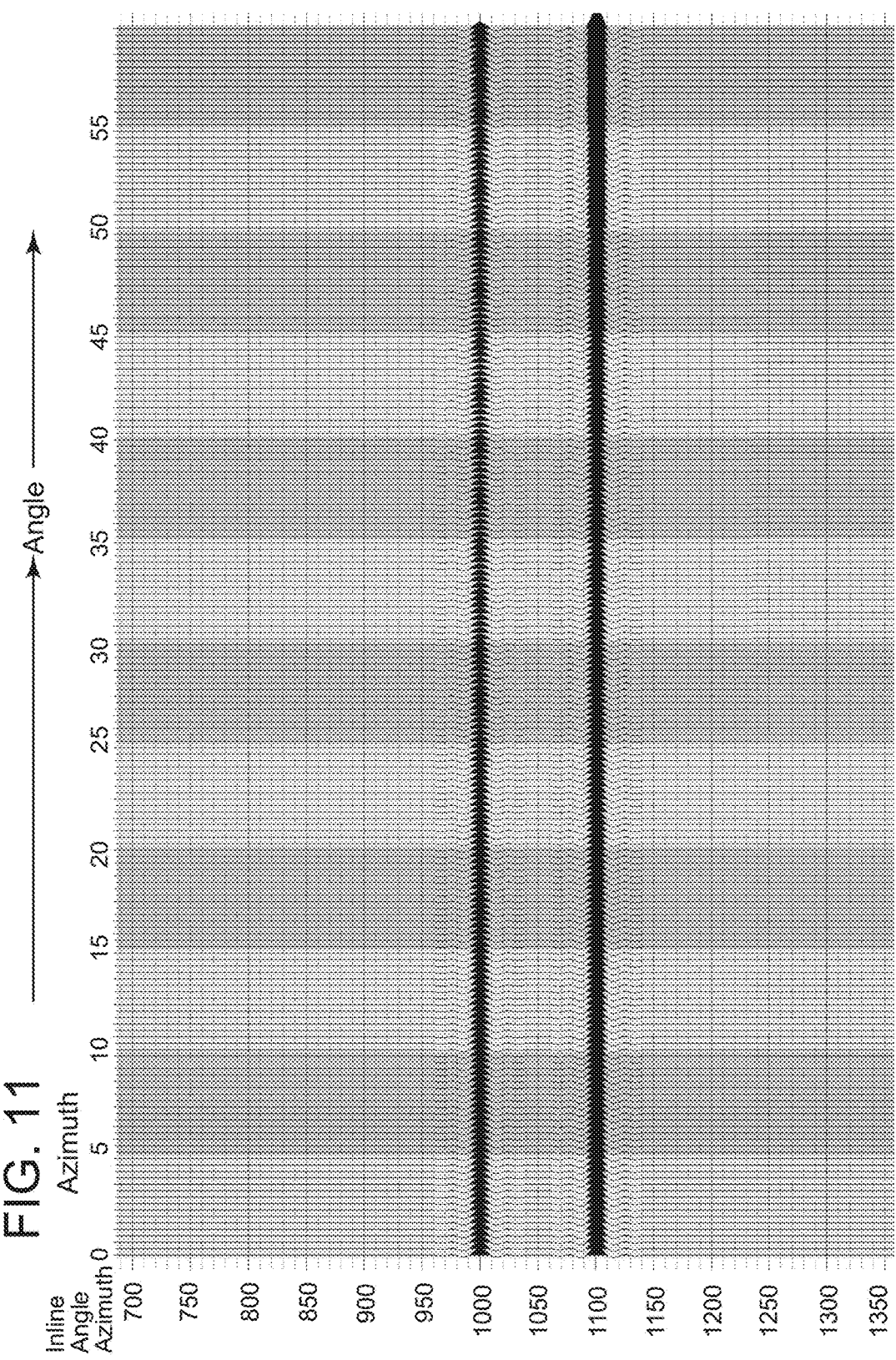
FIG. 11 illustrates a synthetic data gather.
Figure 12:
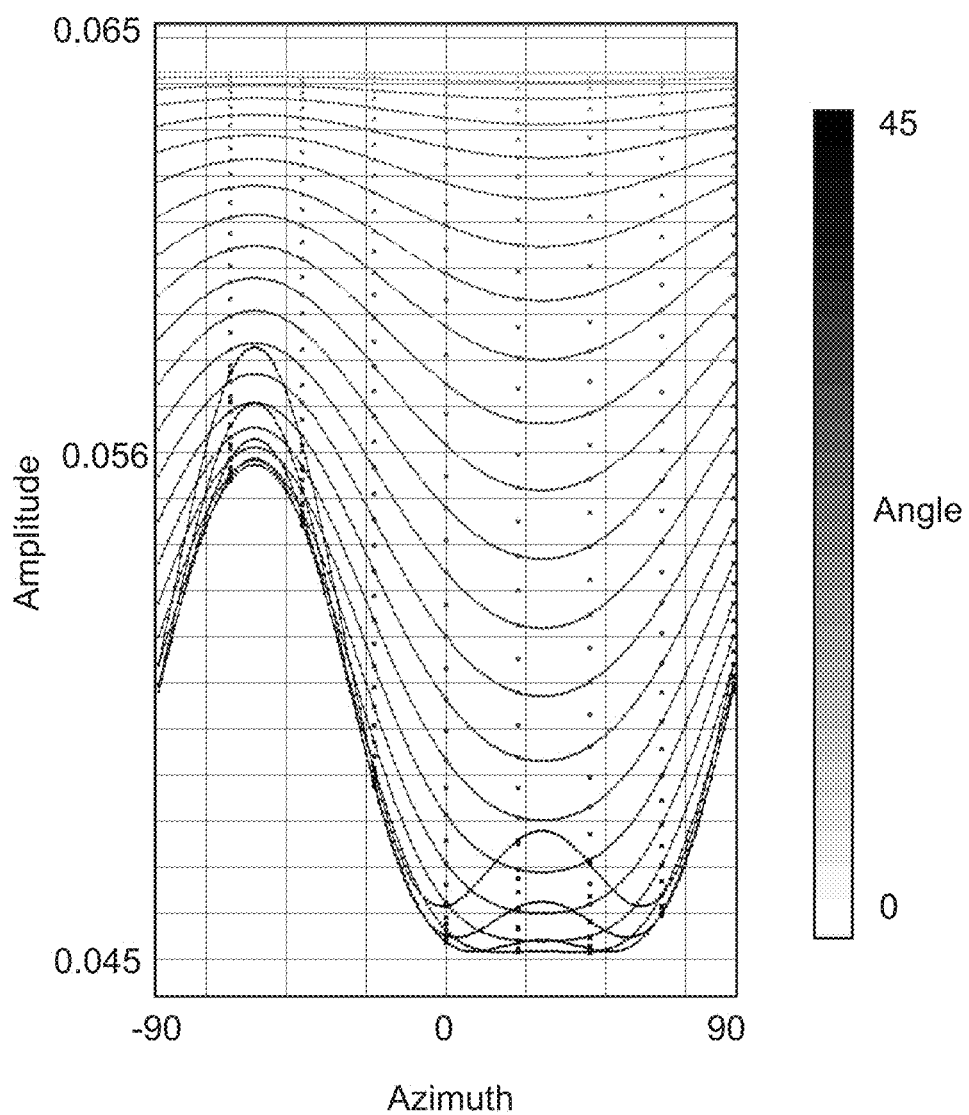
FIG. 12 illustrates amplitude versus angle of the synthetic data.

The resulting synthetic data gather is shown in FIG. 11. The synthetic was generated as a common-angle common azimuth (CACAz) gather. The incidence angle goes from 0 to 45° and the azimuth from 0 to 360° in 22.5° increments. The amplitude at the zone of interest (1,000 ms) is displayed in FIG. 12 as a function of azimuth. The actual data is displayed as a series of dots where varying nuances of gray represent the different incidence angles. The overlying solid lines represent the estimated model generated from the inversion results. The estimated model matches the data well. In this case, the nonlinear inversion is performed on only a single interface, the time sample at 1,000 ms.

Figure 13:
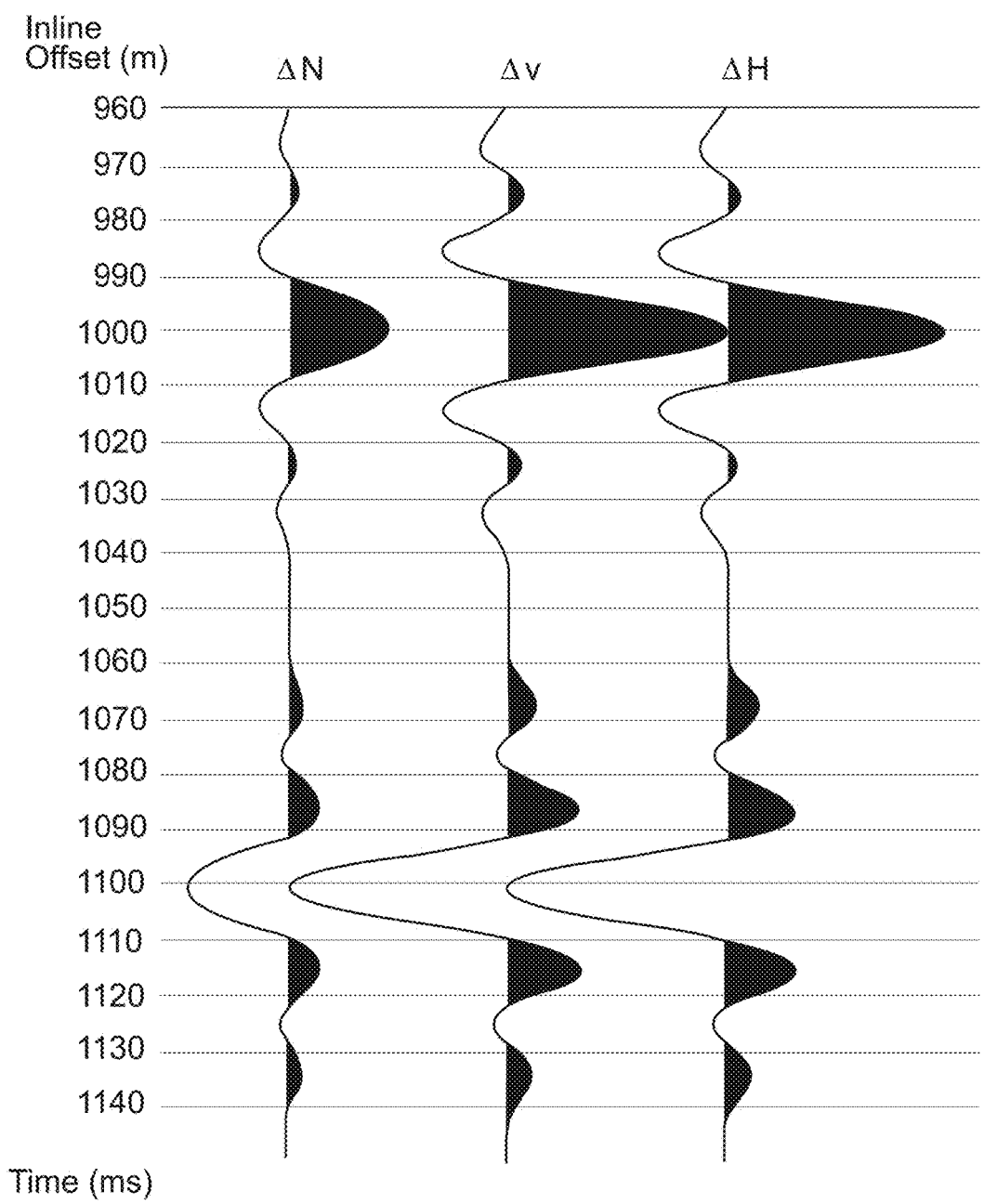
FIG. 13 sets forth graphs of the normal, vertical and horizontal fracture weakness contrast parameters estimated from the seven-parameter AVOAz inversion versus time.

FIG. 13 shows the results of applying this constraint to the inversion of equation (23) on synthetic data, in graphs of the normal, vertical and horizontal fracture weakness contrast parameters estimated from the seven-parameter AVOAz inversion versus time (corresponding to depth inside the surveyed underground formation). All these parameters yield the correct azimuth of 30°. The fracture weakness changes are all positive at the top of the fractured zone (1,000 ms) and negative at the base (1,100 ms) and have the correct polarity. The parameters are transformed using equation (17).

Figure 14:
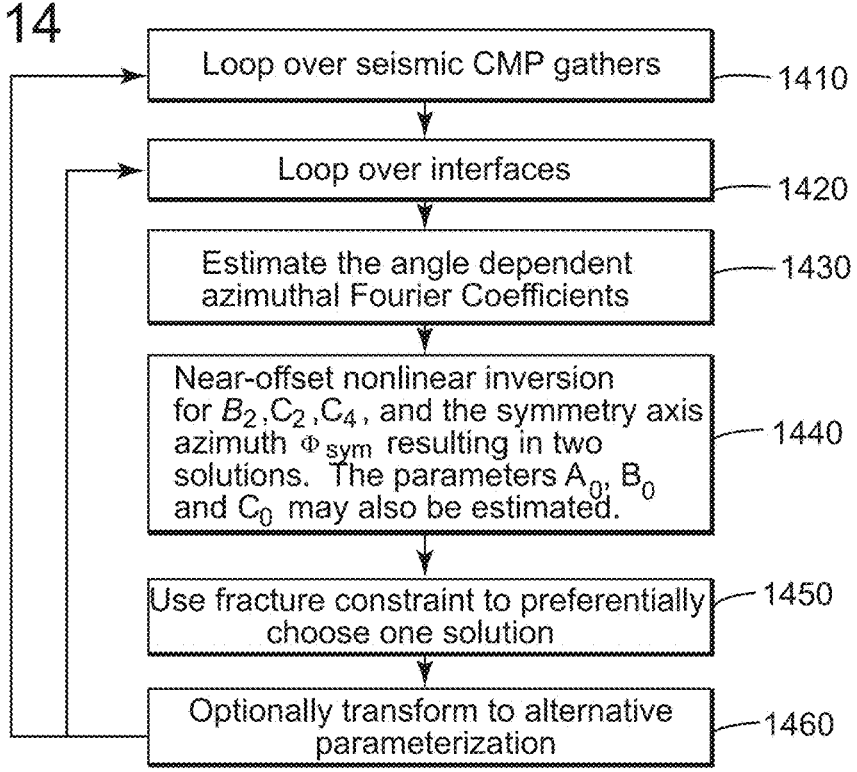
FIG. 14 is a flowchart of far-offset AVOAz inversion using fracture constraints according to an embodiment.

FIG. 14 is a flowchart of far-offset AVOAz inversion using fracture constraints according to an embodiment. Boxes 1410 and 1420 indicate looping over seismic CMP gathers and interfaces, but the processing performed in 1430, 1440 and 1450 is independent for each CMP gather and rock layer interface. The processing performed in 1430, 1440 and 1450 is another specific implementation of step 330 in FIG. 3.

At 1430, the angle-dependent azimuthal Fourier coefficients are estimated. At 1440, a far-offset nonlinear inversion of equation (17) is performed to determine $B_2$, $C_2$, $C_4$ and the symmetry axis azimuth $\phi_{sym}$. The inversion yields two solutions and, thus, two values for $\phi_{sym}$. Parameters $A_0$, $B_0$ and $C_0$ may also be estimated. Then, at 1450, the fracture constraint is used to choose one of the $\phi_{sym}$ values. Optionally, at 1460, these parameters may be converted in alternative parameterization (e.g., the anisotropic gradient and Thomsen parameters).

Penny-Shaped Fracture Constraints

Another type of rock physics relationship used to select the fracture orientation is based on penny-shape crack (i.e., fracture) theory (see, e.g., Hudson's 1981 article entitled "Wave speeds and attenuation of elastic waves in material containing cracks" published in *Geophysics J. Royal Astronomy Soc.* No. 64, pp. 133-150 the entire content of which is incorporated herein by reference). The assumption that a mean crack is circular in a horizontal plane reduces the fracture parameters to a single variable:

$$\begin{bmatrix} \Delta \delta_T \\ \Delta \delta_N^{dry} \end{bmatrix} = \begin{bmatrix} \frac{16}{3(3-2g)} \\ \frac{4}{3g(1-g)} \end{bmatrix} [\Delta \zeta]. \quad (28)$$

Figure 15:
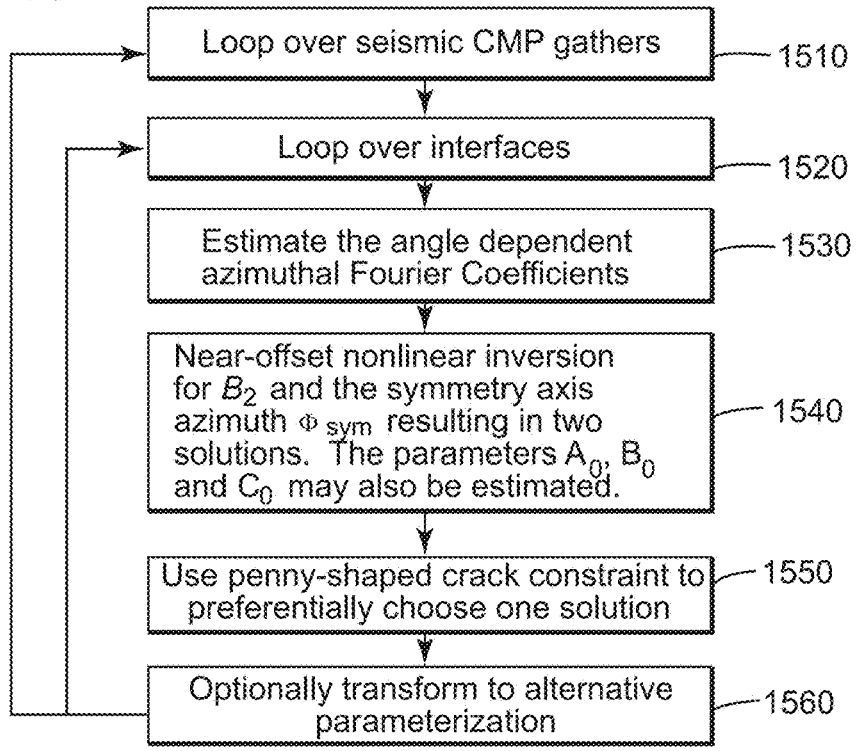
FIG. 15 is a flowchart of near-offset AVOAz inversion using penny-shaped fracture constraints according to an embodiment.

Combining this constraint (equation 28) with equation (26) leads to a unique solution for both the near-offset and far-offset AVOAz inverse problems. FIG. 15 is a flowchart of near-offset AVOAz inversion using penny-shaped fracture constraints according to an embodiment. Boxes 1510 and 1520 indicate looping over seismic CMP gathers and interfaces, but the processing performed in 1530, 1540 and 1550 is independent for each CMP gather and rock layer interface. The processing performed in 1530, 1540 and 1550 is yet another specific implementation of step 330 in FIG. 3.

At 1530, the angle-dependent azimuthal Fourier coefficients are estimated. At 1540, a near-offset nonlinear inversion of equation (25) is performed to determine $B_2$ and the symmetry axis azimuth $\phi_{sym}$. The inversion yields two solutions and, thus, two values for $\phi_{sym}$. Parameters $A_0$ and $B_0$ may also be estimated. Then, at 1550, the penny-shaped fracture constraint is used to choose one of the $\phi_{sym}$ values. Optionally, at 1560, these parameters may be converted in alternative parameterization (e.g., the anisotropic gradient and Thomsen parameters).

Empirical Anisotropic Constraints

Under the assumption that the P-wave anisotropy $\varepsilon^{(v)}$ approximately equals the S-wave anisotropy $\gamma^{(v)}$, the transform matrix (equation 16) becomes $$\begin{bmatrix} B_2 \\ C_2 \\ C_4 \end{bmatrix} = \begin{bmatrix} \frac{1}{4} & -2g \\ 0 & \frac{1}{4} \\ -\frac{1}{16} & \frac{1}{16} \end{bmatrix} \begin{bmatrix} \Delta \delta^{(v)} \\ \Delta \gamma^{(v)} \end{bmatrix}. \quad (29)$$

Figure 16:
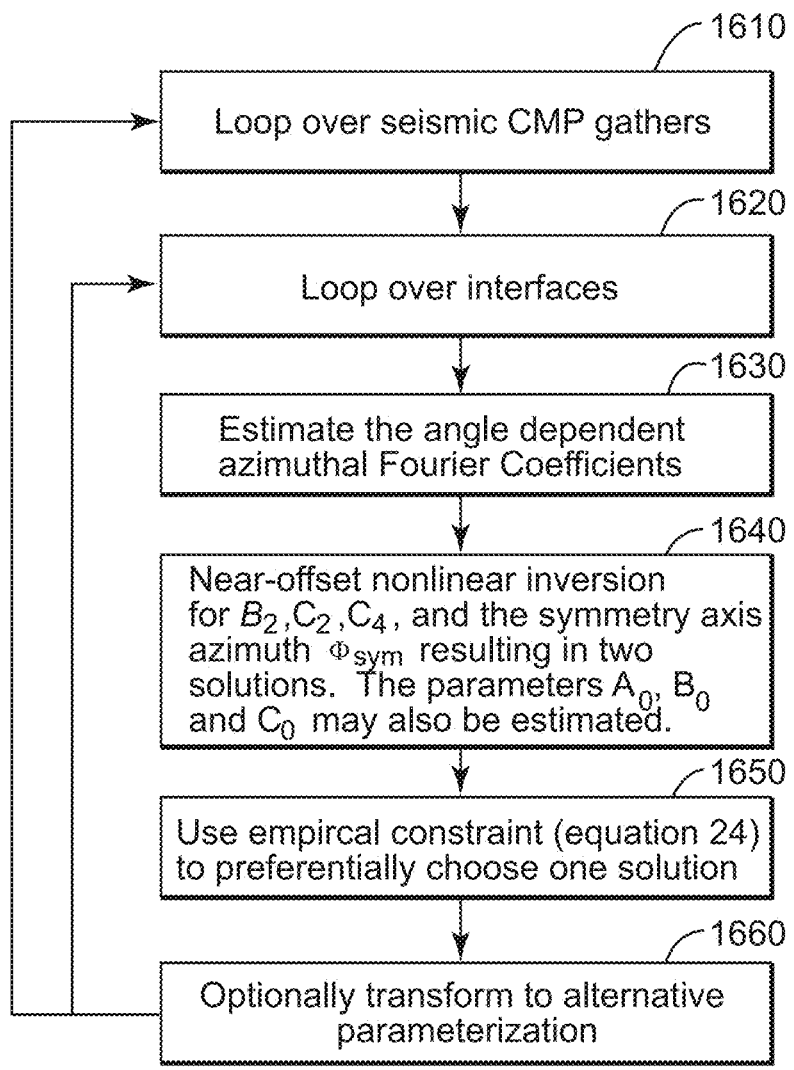
FIG. 16 is a flowchart of far-offset AVOAz inversion using fracture constraints according to an embodiment.

This constraint (equation 29) may be used in a similar fashion as equation (26) to constrain the far-offset AVOAz inverse problem (equations 23 and 24). FIG. 16 is a flowchart of far-offset AVOAz inversion using fracture constraints according to an embodiment. Boxes 1610 and 1620 indicate looping over seismic CMP gathers and interfaces, but the processing performed in 1630, 1640 and 1650 (which is yet another specific implementation of step 330 in FIG. 3) is independent for each CMP gather and rock layer interface.

At 1630, the angle-dependent azimuthal Fourier coefficients are estimated. At 1640, a far-offset nonlinear inversion of equation (17) is performed to determine $B_2$, $C_2$, $C_4$ and the symmetry axis azimuth $\phi_{sym}$. The inversion yields two solutions and, thus, two values for $\phi_{sym}$. Parameters $A_0$, $B_0$ and $C_0$ may also be estimated. Then, at 1650, the empirical constraint in equation (29) is used to choose one of the $\phi_{sym}$ values. Optionally, at 1660, these parameters may be converted in alternative parameterization (e.g., the anisotropic gradient and Thomsen parameters).

In a generalized view, the methods in FIGS. 8, 9, and 14-16 are summarized as follows:
1. For each time segment which indicates an interface, the azimuthal Fourier coefficients are estimated as a function of angle.
2. The azimuthal FCs from step 1 are then input into a nonlinear inversion.
   a. In the near-offset case, the nonlinear inversion is based on equations (7) or (25), leading to a bimodal solution of the form ($\hat{\phi}_{sym}$, $+\hat{B}_2$) and ($\hat{\phi}_{sym}+\pi/2$, $-\hat{B}_2$).
   b. In the far-offset case, the nonlinear inversion is based on equations (23) or (24), leading to a bimodal solution of the form ($\hat{\phi}_{sym}$, $+\hat{B}_2$, $+\hat{C}_2$, $\hat{C}_4$) and ($\hat{\phi}_{sym}+\pi/2$, $-\hat{B}_2$, $-\hat{C}_2$, $\hat{C}_4$).
3. Rock physics and/or stress constraints are then used to choose one solution over the other.
4. The parameters are then optionally transformed to some other parameterization using equations (14), (15), (16), (17), (26), (28) and (29). In the near-offset case this only involves transforming the parameter $B_0$ and $B_2$. In the far-offset case this might also involve transforming the parameters $C_0$, $C_2$ and $C_4$.

Continuity Constraints

In practice, the analysis is complicated by areas of little or no anisotropy, lack of data, noise and the wavelet. If there is no anisotropy or reflectors, there is no azimuthal amplitude data to determine the symmetry axis azimuth. This is the case for synthetic data generated from the model shown in FIG. 10 where there is no contrast in elastic parameters at 1,050 ms and, hence, no azimuthal data to determine the symmetry axis azimuth. This problem may be mitigated by information provided by the wavelet, when the convolved response is analyzed, instead of analyzing one or more isolated reflectors. The convolution process effectively smears out the point reflectivity response over many time samples so there is generally enough data to perform the analysis. As the analysis time increases away from the interface generating the reflectivity, the amplitude typically decreases, the signal-to-noise becomes poorer and the estimate less reliable.

If data has poor signal-to-noise ratio, the processing can be improved by incorporating continuity constraints along with the rock physics and stress constraints. These types of constraints use the fact that the reflectivity has been convolved by a wavelet and shares common statistics over the length of the wavelet. For example, if one plots the attributes $B_2$, $C_2$ and $C_4$ estimated by inverting equation (24) for every time (or depth) sample over some time (or depth) window, the resulting points define two lines in the 3D attribute space, each corresponding to different symmetry axis solutions. Even if there are two tuned reflectors with opposite polarities, the data still clusters as lines in the 3D attribute space, since the polarity is just a −1 scalar. This aspect can be generalized to N interfaces provided they all share the same symmetry azimuth. There should be as many clusters as sparse reflectivity with different symmetry axis azimuths.

Figure 17:
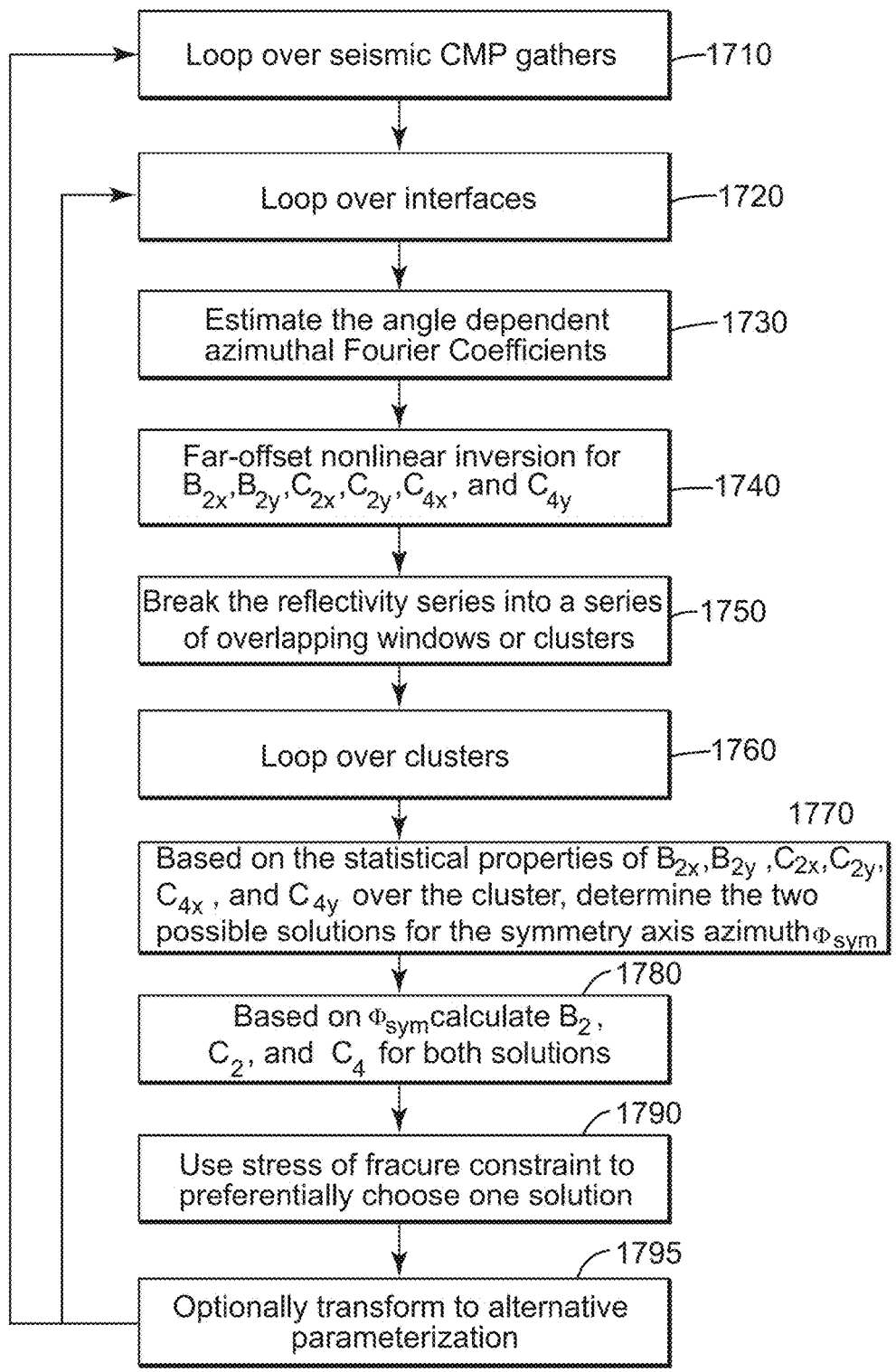
FIG. 17 is a flowchart of a method using continuity constraints according to an embodiment.

For real data, normal move-out stretch and tuning introduces some scatter, but each symmetry axis solution is still a clearly defined cluster. The statistics of this multidimensional data (or attributes) may be summarized using covariance matrices. Since the seismic amplitude is zero mean, the attributes $B_2$, $C_2$ and $C_4$ and resulting clusters are zero mean. The covariance matrix can be further characterized by performing an eigenvalue decomposition. The inclusion of continuity constraints yields a method according to an embodiment schematically illustrated in FIG. 17.

Box 1710 indicates looping over seismic CMP gathers, yet each gather is processed independently. For each CMP gather the process iterates over all time samples (interfaces as indicated by box 1720) performing the following steps:

1. For each time sample (interface), the azimuthal FCs are estimated as a function of angle at 1730;
2. The azimuthal FCs from step 1 are then input into a nonlinear inversion based on equations (24) or (25), leading to a bimodal solution of the form $(\hat{\phi}_{sym}, +\hat{B}_2, +\hat{C}_2, \hat{C}_4)$ and $(\hat{\phi}_{sym}+\pi/2, -\hat{B}_2, -\hat{C}_2, \hat{C}_4)$ at 1740. In order to average the estimates from adjacent time samples, the attributes are transformed as follows:

$$B_{2x}=B_2\cos(2\hat{\phi}_{sym}),$$

$$B_{2y}=B_2\sin(2\hat{\phi}_{sym}),$$

$$C_{2x}=C_2\cos(2\hat{\phi}_{sym}),$$

$$C_{2y}=C_2\sin(2\hat{\phi}_{sym}),$$

$$C_{4x}=C_4\cos(4\hat{\phi}_{sym}),$$

$$C_{4y}=C_4\sin(4\hat{\phi}_{sym}), \tag{30}$$

3. Once the attributes $B_{2x}$, $B_{2y}$, $C_{2x}$, $C_{2y}$, $C_{4x}$, and $C_{4y}$ have been estimated for each time sample in the CMP, these attributes are then separated into a series of clusters at 1750. This may be done in a variety of ways, including running a sliding window or some data adaptive technique.

4. Box 1760 indicates looping over the clusters for steps 1770 and 1780.

5. For each window or cluster, determine the symmetry axis azimuth $\phi_{sym}$. This involves first identifying the two possible symmetry axis azimuth solutions.

6. Then, at 1780, the time-dependent parameters are calculated for each time sample over the range of possible $\phi_{sym}$ values $$B_2(t)=B_{2x}(t)\cos(2\phi_{sym})+B_{2y}(t)\sin(2\phi_{sym}),$$

$$C_2(t)=C_{2x}(t)\cos(2\phi_{sym})+C_{2y}(t)\sin(2\phi_{sym}),$$

$$C_4(t)=C_{4x}(t)\cos(4\phi_{sym})+C_{4y}(t)\sin(4\phi_{sym}), \tag{31}$$

holding the symmetry axis constant for the whole window.

7. Based on results of the previous step, make estimates of the attributes $\hat{B}_{2x}$, $\hat{B}_{2y}$, $\hat{C}_{2x}$, $\hat{C}_{2y}$, $\hat{C}_{4x}$, and $\hat{C}_{4y}$, using the equation (30). The misfit between the input attribute and estimated attributes thus calculated are $$\Delta B_{2x}=B_{2x}-\hat{B}_{2x},$$

$$\Delta B_{2y}=B_{2y}-\hat{B}_{2y},$$

$$\Delta C_{2x}=C_{2x}-\hat{C}_{2x},$$

$$\Delta C_{2y}=C_{2y}-\hat{C}_{2y},$$

$$\Delta C_{4x}=C_{4x}-\hat{C}_{4x},$$

$$\Delta C_{4y}=C_{4y}-\hat{C}_{4y}. \tag{32}$$

One local solution $\phi_{sym}$ corresponds to the minimum misfit solution. The other solution is 90° apart.

8. Rock physics and/or stress constraints are then used to choose one solution over the other and calculate $B_2$, $C_2$ and $C_4$ at 1780 and 1790. One manner of achieving this is outlined below:

a. Based on the symmetry axis azimuth $\phi_{sym}$ established in the previous step, the attributes $B_2$, $C_2$ and $C_4$ are calculated using equation (31) for the window. These attributes are then used to calculate a 3×3 covariance matrix. This covariance matrix summarizes the statistics of the cluster. The $2^{nd}$ symmetry axis azimuth has the same covariance matrix, but the off-diagonal elements have opposite polarity.

b. The eigenvalues and eigenvectors are then calculated for these two 3×3 covariance matrices. The largest eigenvalue corresponds to the largest reflectivity within the window. The eigenvector corresponding to the largest eigenvalue is used to characterize the cluster.

c. The largest eigenvalue is used to determine if the symmetry axis can be estimated reliably. If the eigenvalue exceeds some threshold, then the rock physics constraint is used to choose between the two possible symmetry axis azimuth solutions. For example, the rock physics constraint $\delta_V=\delta_H$ (equation 26) defines a plane in the 3D attribute space ($B_2$, $C_2$ and $C_4$). The distance between this plane and the first eigenvector is calculated for both symmetry axis azimuth solutions. The eigenvector (and solution) closest to plane is chosen. The other rock constraints may be implemented in a similar fashion. If the eigenvalue is lower than the threshold, then there is not enough information to reliably determine the symmetry axis. In this case, the symmetry axis azimuth can be interpolated/extrapolated using values from adjacent windows. Alternatively, the stress constraint may also be used.

Figure 18:
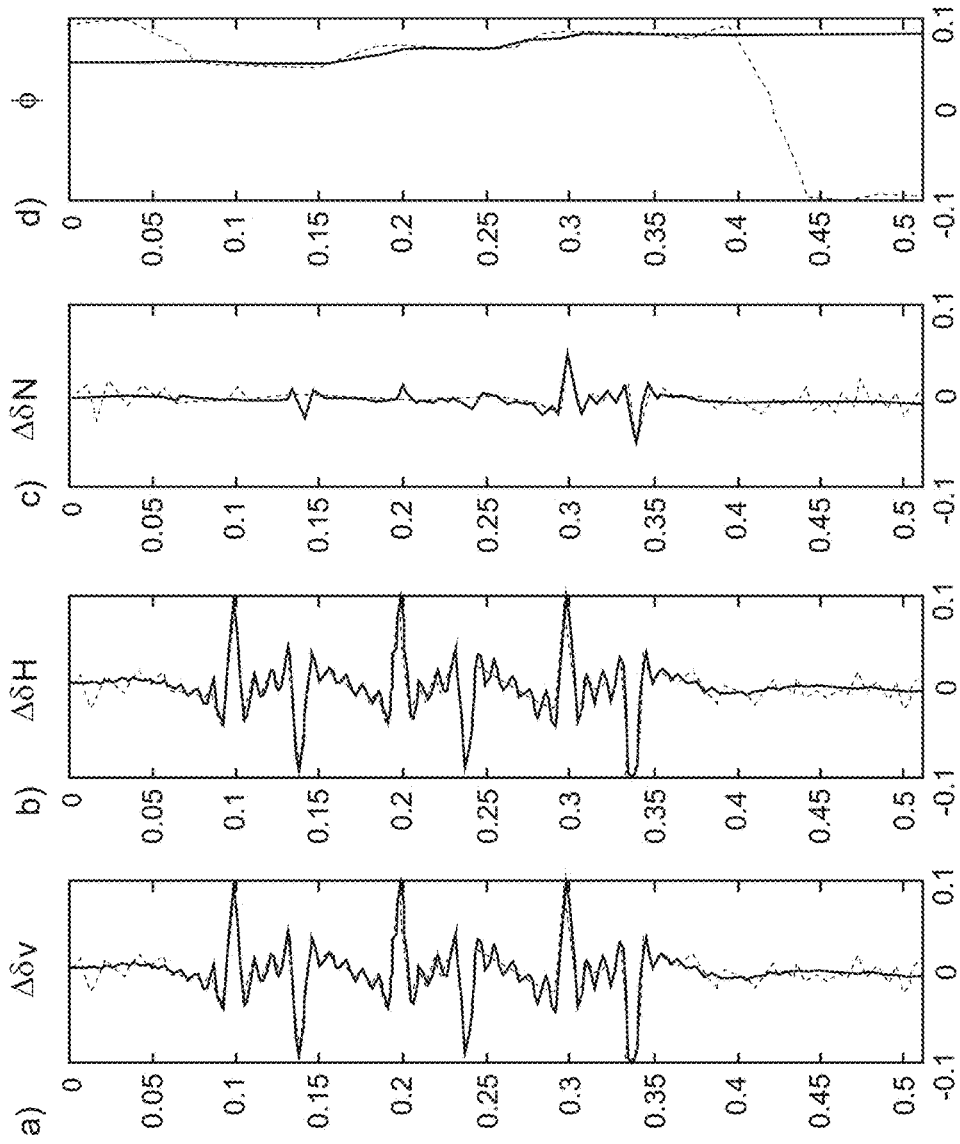
FIG. 18 sets forth graphs illustrating results of applying the method in FIG. 17.

FIG. 18 illustrates the results obtained by applying this method to synthetic data with a signal-to-noise ratio of 2:1. The figure displays graphs (having a common time in seconds vertical axis) of (a) vertical, (b) horizontal and (c) normal fracture weakness contrast parameters estimated from the seven-parameter AVOAz inversion based on synthetic data. The estimate is represented using a dashed line while the actual solution is a continuous line. Graph (d) shows the estimate of the fracture-strike azimuth that for all layers was 60°. The method achieved a good match from 0.075 s to 0.4 s where there is adequate data to make an estimate. At the end of the trace (over 0.4 s), the estimated azimuth drifts away from the solution of 60° due to the lack of data on which to estimate the azimuth.

Figure 19:
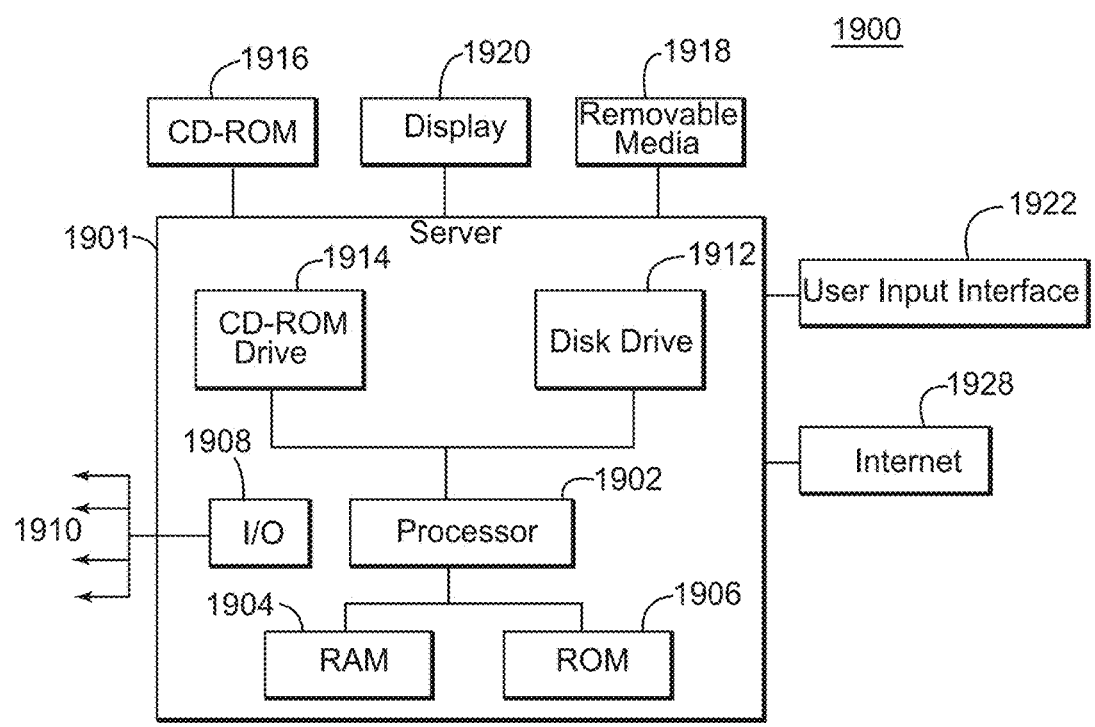
FIG. 19 is a schematic diagram of a computing device that can implement any of the methods discussed herein.

The above-discussed procedures and methods may be implemented in a computing device as illustrated in FIG. 19. Hardware, firmware, software or a combination thereof may be used to perform the various steps and operations described herein. Computing device 1900 of FIG. 19 is an exemplary computing structure that may be used in connection with such a system.

Exemplary computing device 1900 suitable for performing the activities described in the exemplary embodiments may include a server 1901. Such a server 1901 may include a central processor (CPU) 1902 coupled to a random access memory (RAM) 1904 and to a read-only memory (ROM) 1906. ROM 1906 may also be other types of storage media to store programs, such as programmable ROM (PROM), erasable PROM (EPROM), etc. Processor 1902 may communicate with other internal and external components through input/output (I/O) circuitry 1908 and bussing 1910 to provide control signals and the like. Processor 1902 carries out a variety of functions as are known in the art, as dictated by software and/or firmware instructions.

Server 1901 may also include one or more data storage devices, including hard drives 1912, CD-ROM drives 1914 and other hardware capable of reading and/or storing information, such as DVD, etc. In one embodiment, software for carrying out the above-discussed steps may be stored and distributed on a CD-ROM or DVD 1916, a USB storage device 1918 or other form of media capable of portably storing information. These storage media may be inserted into, and read by, devices such as CD-ROM drive 1914, disk drive 1912, etc. Server 1901 may be coupled to a display 1920, which may be any type of known display or presentation screen, such as LCD, plasma display, cathode ray tube (CRT), etc. A user input interface 1922 is provided, including one or more user interface mechanisms such as a mouse, keyboard, microphone, touchpad, touch screen, voice-recognition system, etc.

Server 1901 may be coupled to other devices, such as sources, detectors, etc. The server may be part of a larger network configuration as in a global area network (GAN) such as the Internet 1928, which allows ultimate connection to various landline and/or mobile computing devices.

The disclosed exemplary embodiments provide a computing device, software instructions and method for seismic data processing. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for characterizing a fracture in an underground structure, the method comprising:
receiving seismic data acquired during a seismic survey of the underground structure, and additional geological information;
generating common midpoint, CMP, gathers of traces from the seismic data;
for each interface encountered by traces in at least one of the CMP gathers:
(i) estimating angle-dependent azimuthal Fourier coefficients, FCs,
(ii) performing a nonlinear inversion of amplitude versus offset and azimuth angle, AVOAz, equations built using the angle-dependent azimuthal Fourier coefficients to determine possible fracture orientations, and
(iii) selecting one of the possible fracture orientations using a stress constraint, a symmetric fracture constraint, a penny shape fracture constraint, an empirical constraint and/or a continuity constraint based on the additional geological information; and
producing an image of the underground structure including the fracture with the selected one of the possible fracture orientations, the image being usable to design a hydrocarbon extraction plan.

2. The method of claim 1, wherein the possible fracture orientations refer to azimuths of fracture's horizontal symmetry axis in a transverse isotropic media.

3. The method of claim 1, wherein the possible fracture orientations refer to azimuth of fracture's normal in an orthorhombic anisotropic media.

4. The method of claim 1, wherein the nonlinear inversion determines two solutions including parameter $B_2$ and possible fracture orientations $\phi_{sym}$ by solving $$\begin{bmatrix} u_2(\theta) \\ v_2(\theta) \end{bmatrix} = \begin{bmatrix} x\cos(2\phi_{sym}) \\ x\sin(2\phi_{sym}) \end{bmatrix} [B_2],$$

for a near-offset data subset of the seismic data where $u_2$ and $v_2$ are the angle-dependent azimuthal FCs, and $x=\sin^2\theta$.

5. The method of claim 1, wherein the nonlinear inversion determines two solutions including parameters $B_2$, $C_2$, $C_4$ and possible fracture orientations $\phi_{sym}$ by solving $$\begin{bmatrix} u_2(\theta) \\ v_2(\theta) \\ u_4(\theta) \\ v_4(\theta) \end{bmatrix} = \begin{bmatrix} x\cos(2\phi_{sym}) & z\cos(2\phi_{sym}) & 0 \\ x\sin(2\phi_{sym}) & z\sin(2\phi_{sym}) & 0 \\ 0 & 0 & z\cos(4\phi_{sym}) \\ 0 & 0 & z\sin(4\phi_{sym}) \end{bmatrix} \begin{bmatrix} B_2 \\ C_2 \\ C_4 \end{bmatrix},$$

for a far-offset data subset of the seismic data, where $u_2$, $u_4$, $v_2$ and $v_4$ are the angle-dependent azimuthal FCs, $x=\sin^2 \theta$, and $z=\sin^2 \theta \tan^2 \theta$.

6. The method of claim 1, wherein the stress constraint included in the additional geological information is used to select the one of the possible orientations.

7. The method of claim 1, wherein the symmetric fracture constraint included in the additional geological information is used to select the one of the possible orientations, the symmetric fracture constraint requiring that horizontal and vertical fracture weakness parameters to be substantially equal.

8. The method of claim 1, wherein the penny-shaped fracture constraint included in the additional geological information is used to select the one of the possible orientations.

9. The method of claim 1, wherein the empirical constraint included in the additional geological information is used to select the one of the possible orientations.

10. The method of claim 1, wherein the continuity constraint included in the additional geological information is used to select the one of the possible orientations.

11. A seismic data processing apparatus is configured to obtain an image of a fracture in an underground structure probed using seismic waves, the apparatus including:
 a user input interface configured to receive seismic data acquired during a seismic survey of the underground structure, and additional geological information;
 one or more processors configured to generate common midpoint, CMP, gathers of traces from the seismic data, and then, for each interface encountered by traces in at least one of the CMP gathers, the one or more processors being further configured to,
  (i) estimate angle-dependent azimuthal Fourier coefficients, FCs,
  (ii) perform a nonlinear inversion of amplitude versus offset and azimuth angle, AVOAz, equations built using the angle-dependent azimuthal FCs to determine possible fracture orientations, and
  (iii) select one of the possible fracture orientations using a stress constraint, a symmetric fracture constraint, a penny shape fracture constraint, an empirical constraint and/or a continuity constraint based on the additional information; and
 a display configured to display reflectivity in vertical slices of the underground structure, including the fracture with the selected one of the possible fracture orientations, these vertical slices being usable to design a hydrocarbon extraction plan.

12. The seismic data processing apparatus of claim 11, wherein the possible fracture orientations refer to azimuths of fracture's horizontal symmetry axis in a transverse isotropic media.

13. The seismic data processing apparatus of claim 11, wherein the possible fracture orientations refer to azimuth of fracture's normal in an orthorhombic anisotropic media.

14. The seismic data processing apparatus of claim 11, wherein the nonlinear inversion determines two solutions including parameter $B_2$ and possible fracture orientations $\phi_{sym}$ by solving $$\begin{bmatrix} u_2(\theta) \\ v_2(\theta) \end{bmatrix} = \begin{bmatrix} x\cos(2\phi_{sym}) \\ x\sin(2\phi_{sym}) \end{bmatrix} [B_2],$$

for a near-offset data subset of the seismic data where $u_2$ and $v_2$ are the angle-dependent azimuthal FCs, and $x=\sin^2 \theta$.

15. The seismic data processing apparatus of claim 11, wherein the nonlinear inversion determines two solutions including parameters $B_2$, $C_2$, $C_4$ and possible fracture orientations $\phi_{sym}$ by solving $$\begin{bmatrix} u_2(\theta) \\ v_2(\theta) \\ u_4(\theta) \\ v_4(\theta) \end{bmatrix} = \begin{bmatrix} x\cos(2\phi_{sym}) & z\cos(2\phi_{sym}) & 0 \\ x\sin(2\phi_{sym}) & z\sin(2\phi_{sym}) & 0 \\ 0 & 0 & z\cos(4\phi_{sym}) \\ 0 & 0 & z\sin(4\phi_{sym}) \end{bmatrix} \begin{bmatrix} B_2 \\ C_2 \\ C_4 \end{bmatrix},$$

for a far-offset data subset of the seismic data, where $u_2$, $u_4$, $v_2$ and $v_4$ are the angle-dependent azimuthal FCs, $x=\sin^2 \theta$, and $z=\sin^2 \theta \tan^2 \theta$.

16. The seismic data processing apparatus of claim 11, wherein the stress constraint included in the additional geological information is used to select the one of the possible orientations.

17. The seismic data processing apparatus of claim 11, wherein the symmetric fracture constraint included in the additional geological information is used to select the one of the possible orientations, the symmetric fracture constraint requiring that horizontal and vertical fracture weaknesses to be substantially equal.

18. The seismic data processing apparatus of claim 11, wherein the penny-shaped fracture constraint included in the additional geological information is used to select the one of the possible orientations.

19. The seismic data processing apparatus of claim 11, wherein the empirical constraint included in the additional geological information is used to select the one of the possible orientations.

20. A non-transitory computer-readable recording medium storing executable codes which, when executed by a computer, make the computer perform a method for characterizing a fracture in an underground structure, the method comprising:
 receiving seismic data acquired during a seismic survey of the underground structure, and additional geological information;
 generating common midpoint, CMP, gathers of traces from the seismic data;
 for each interface encountered by traces in at least one of the CMP gathers:
  (i) estimating angle-dependent azimuthal Fourier coefficients, FCs,
  (ii) performing a nonlinear inversion of amplitude versus offset and azimuth angle, AVOAz, equations built using the angle-dependent azimuthal Fourier coefficients to determine possible fracture orientations, and (iii) selecting one of the possible fracture orientations using a stress constraint, a symmetric fracture constraint, a penny shape fracture constraint, an empirical constraint or a continuity constraint based on the additional information; and producing an image of the underground structure including the fracture with the selected one of the possible fracture orientations, the image being usable to design a hydrocarbon extraction plan.

* * * * *